United States Patent
Zhou et al.

(10) Patent No.: US 11,757,578 B2
(45) Date of Patent: *Sep. 12, 2023

(54) SUPPORTING NETWORK TRANSMISSIONS USING UNICAST SIDELINK COMMUNICATIONS

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 17/302,807

(22) Filed: May 12, 2021

(65) Prior Publication Data
US 2021/0391957 A1    Dec. 16, 2021

Related U.S. Application Data

(60) Provisional application No. 63/037,545, filed on Jun. 10, 2020, provisional application No. 63/037,556, filed on Jun. 10, 2020.

(51) Int. Cl.
| | |
|---|---|
| *H04L 1/1812* | (2023.01) |
| *H04W 80/02* | (2009.01) |
| *H04W 72/0453* | (2023.01) |
| *H04L 1/1607* | (2023.01) |
| *H04W 28/06* | (2009.01) |
| *H04W 72/04* | (2023.01) |

(Continued)

(52) U.S. Cl.
CPC .......... *H04L 1/1819* (2013.01); *H04L 1/1607* (2013.01); *H04W 28/06* (2013.01);
(Continued)

(58) Field of Classification Search
CPC ................. H04L 1/1819; H04L 1/1607; H04L 2001/0093; H04L 2001/0097;
(Continued)

(56) References Cited

U.S. PATENT DOCUMENTS

| | | | |
|---|---|---|---|
| 2014/0289581 A1* | 9/2014 | Maret | H04L 1/20 714/751 |
| 2017/0149490 A1* | 5/2017 | Star | H04B 7/026 |

(Continued)

OTHER PUBLICATIONS

Quoc-Tuan Vien et al.: "Cooperative Retransmission for Wireless Regenerative Multi relay Networks", IEEE Transactions on Vehicular Technology, IEEE Service Center, Piscataway, NJ, US, vol. 62, No. 2, Feb. 1, 2013 (Feb. 1, 2013), pp. 735-747 (Year: 2013).*

(Continued)

*Primary Examiner* — Shailendra Kumar
(74) *Attorney, Agent, or Firm* — Arun Swain

(57) ABSTRACT

This disclosure provides systems, methods, and apparatuses for supporting network transmissions using unicast sidelink communications. A base station (BS) may transmit a set of encoded packets to a number of user equipment (UEs) and receive feedback messages from the UEs that indicate sets of decoded packets. Based on the feedback messages, the BS may transmit an updated set of encoded packets based on a difference between the set of encoded packets and the union of decoded packets. The BS may transmit an instruction to a first UE to transmit a unicast sidelink communication to a second UE that includes a set of missed packets that includes one or more decoded packets that were decoded by the first UE but were not decoded by the second UE. The first UE may transmit the unicast sidelink communication to the second UE.

30 Claims, 9 Drawing Sheets

(51) Int. Cl.
  *H04W 72/23* (2023.01)
  *H04W 92/18* (2009.01)
(52) U.S. Cl.
  CPC ....... *H04W 72/04* (2013.01); *H04W 72/0453* (2013.01); *H04W 72/23* (2023.01); *H04W 80/02* (2013.01); *H04W 92/18* (2013.01)
(58) Field of Classification Search
  CPC ... H04L 1/1809; H04L 1/0076; H04L 1/0075; H04W 28/06; H04W 72/04; H04W 72/0453; H04W 72/23; H04W 80/02; H04W 92/18
  See application file for complete search history.

(56) References Cited

U.S. PATENT DOCUMENTS

| | | |
|---|---|---|
| 2021/0168814 A1 | 6/2021 | Chen et al. |
| 2021/0336728 A1* | 10/2021 | Selvanesan ........... H04L 1/1607 |
| 2021/0392544 A1 | 12/2021 | Zhou |
| 2022/0131675 A1* | 4/2022 | Xu ........................ H04W 24/10 |
| 2022/0217690 A1 | 7/2022 | Liu et al. |
| 2022/0225290 A1 | 7/2022 | Ganesan et al. |
| 2022/0240225 A1 | 7/2022 | Lee et al. |

OTHER PUBLICATIONS

International Search Report and Written Opinion—PCT/US2021/070553—ISA/EPO—dated Aug. 20, 2021.

Vien Q-T, et al., "Cooperative Retransmission for Wireless Regenerative Multirelay Networks", IEEE Transactions on Vehicular Technology, IEEE Service Center, Piscataway, NJ, US. vol. 62. No. 2, Feb. 1, 2013 (Feb. 1, 2013), pp. 735-747, XP011493704, ISSN: 0018-9545, DOI:10.1109/TVT.2012.2224393, Section II-A.

* cited by examiner

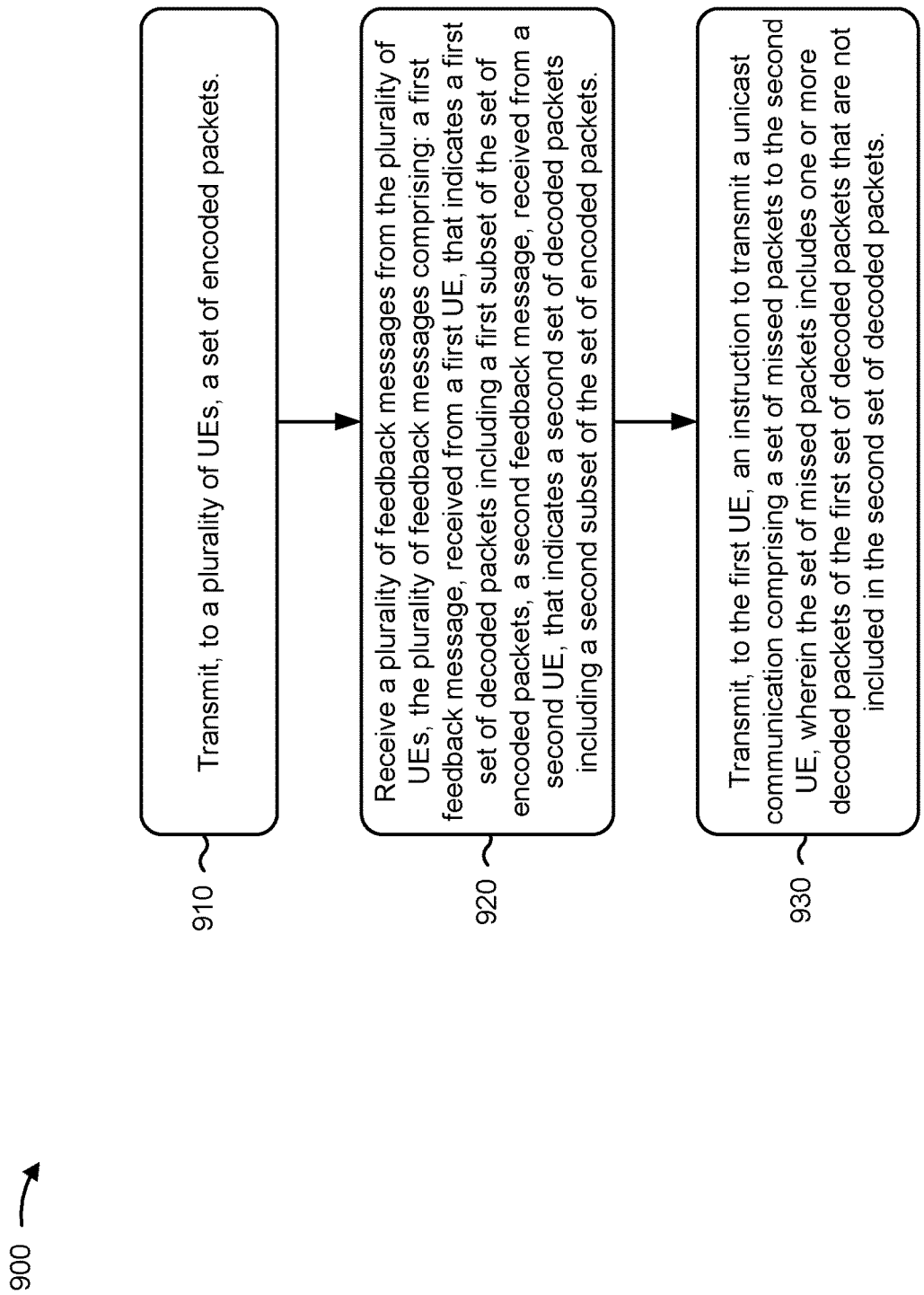

SUPPORTING NETWORK TRANSMISSIONS USING UNICAST SIDELINK COMMUNICATIONS

CROSS-REFERENCE TO RELATED APPLICATIONS

This patent application claims priority to U.S. Provisional Patent Application No. 63/037,545, filed on Jun. 10, 2020, entitled "SUPPORTING NETWORK TRANSMISSIONS USING UNICAST SIDELINK COMMUNICATIONS," and U.S. Provisional Patent Application No. 63/037,556, filed on Jun. 10, 2020, entitled "SUPPORTING NETWORK TRANSMISSIONS USING BROADCAST SIDELINK COMMUNICATIONS," each of which is assigned to the assignee hereof. The disclosures of the prior applications are considered part of and are incorporated by reference into this patent application.

TECHNICAL FIELD

Aspects of the present disclosure relate generally to wireless communication and to techniques for supporting network transmissions using unicast sidelink communications.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a base station (BS) via the downlink (DL) and uplink (UL). "DL" (or "forward link") refers to the communication link from the BS to the UE, and "UL" (or "reverse link") refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, or a 5G NodeB.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by an apparatus of a user equipment (UE). The method may include receiving, from a base station (BS), a set of encoded packets. The method may include transmitting, to the BS, a feedback message that indicates a set of decoded packets. The method may include receiving, from the BS, an instruction to transmit a unicast sidelink communication including a set of missed packets to a second UE, where the set of missed packets includes one or more decoded packets of the set of decoded packets.

In some implementations, the method can include transmitting the unicast sidelink communication to the second UE. In some implementations, the method can include receiving, from the BS, an updated set of encoded packets based on the feedback message. In some implementations, the method can include decoding the set of encoded packets using a decoding function corresponding to an encoding function used to generate the set of encoded packets; and decoding the updated set of encoded packets using the decoding function. In some implementations, the encoding function can include a random matrix and the method can include receiving an indication of the random matrix from the BS. In some implementations, the method can include transmitting, to the BS, an additional feedback message, where the additional feedback message indicates a second set of decoded packets including a subset of the updated set of encoded packets.

In some implementations, the method can include receiving, from the BS, a network coding configuration including a set of network coding parameters. In some implementations, the set of network coding parameters can indicate at least one of: a network coding algorithm, an encoding function, an encoding matrix, a maximum number of decoding iterations, or a combination thereof.

In some implementations, the method can include determining that a performance of the first UE associated with the set of network coding parameters satisfies an underperformance threshold; and transmitting, to the BS, a network coding parameter change request based on determining that the performance of the first UE satisfies the underperformance threshold. In some implementations, the method can include receiving an additional set of network coding parameters from the BS based on the network coding parameter change request.

Another innovative aspect of the subject matter described in this disclosure can be implemented in an apparatus of a UE for wireless communication. The apparatus may include a first interface configured to obtain from a BS a set of encoded packets; and an instruction to transmit a unicast sidelink communication including a set of missed packets to a second UE, where the set of missed packets includes one or more decoded packets of the set of decoded packets. The apparatus may include a second interface configured to output to the base station, a feedback message that indicates a set of decoded packets. In some implementations, the feedback message comprises a dedicated decoding feedback message. In some implementations, the dedicated decoding feedback message can include a network coding sub-layer report.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a BS, a set of encoded packets; transmit, to the BS, a feedback message that indicates a set of decoded packets; and receive, from the BS, an instruction to transmit a unicast sidelink communication including a set of missed packets to a second UE, where the set of missed packets includes one or more decoded packets of the set of decoded packets. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for means for receiving, from a BS, a set of encoded packets; means for transmitting, to the base station, a feedback message that indicates a set of decoded packets; and means for receiving, from the BS, an instruction to transmit a unicast sidelink communication including a set of missed packets to a second apparatus, where the set of missed packets includes one or more decoded packets of the set of decoded packets. In some aspects, the apparatus may perform or implement any one or more of the aspects described in connection with the method, above or elsewhere herein.

Another innovative aspect of the subject matter described in this disclosure can be implemented in a method of wireless communication performed by an apparatus of a UE. The method may include receiving, from a BS, a set of encoded packets. The method may include transmitting, to the BS, a feedback message that indicates a first set of decoded packets. The method may include receiving, from a second UE, a unicast sidelink communication including a set of missed packets, where the set of missed packets includes one or more decoded packets of a second set of decoded packets that are not included in the first set of decoded packets.

Another innovative aspect of the subject matter described in this disclosure can be implemented in an apparatus of a UE for wireless communication. The apparatus may include a first interface configured to obtain a set of encoded packets from a base station; and a unicast sidelink communication, from a second UE, including a set of missed packets, where the set of missed packets includes one or more decoded packets of a second set of decoded packets that are not included in the first set of decoded packets. The apparatus may include a second interface configured to output a feedback message that indicates a first set of decoded packets.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a UE, may cause the one or more processors to receive, from a BS, a set of encoded packets; transmit, to the BS, a feedback message that indicates a first set of decoded packets; receive, from a second UE, a unicast sidelink communication including a set of missed packets, where the set of missed packets includes one or more decoded packets of a second set of decoded packets that are not included in the first set of decoded packets. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for means for receiving, from a base station, a set of encoded packets; means for transmitting, to the base station, a feedback message that indicates a first set of decoded packets; means for receiving, from a second apparatus, a unicast sidelink communication including a set of missed packets, where the set of missed packets includes one or more decoded packets of a second set of decoded packets that are not included in the first set of decoded packets. In some aspects, the apparatus may perform or implement any one or more of the aspects described in connection with the method, above or elsewhere herein.

One innovative aspect of the subject matter described in this disclosure can be implemented in a method of wireless communication performed by an apparatus of a BS. The method may include transmitting, to a plurality of UEs, a set of encoded packets. The method may include receiving a plurality of feedback messages from the plurality of UEs, the plurality of feedback messages including: a first feedback message, received from a first UE, that indicates a first set of decoded packets including a first subset of the set of encoded packets, a second feedback message, received from a second UE, that indicates a second set of decoded packets including a second subset of the set of encoded packets, and transmitting, to the first UE, an instruction to transmit a unicast communication including a set of missed packets to the second UE, where the set of missed packets includes one or more decoded packets of the first set of decoded packets that are not included in the second set of decoded packets.

Another innovative aspect of the subject matter described in this disclosure can be implemented in an apparatus of a BS for wireless communication. The apparatus may include a first interface configured to obtain a plurality of feedback messages from a plurality of UEs, the plurality of feedback messages including: a first feedback message, received from a first UE, that indicates a first set of decoded packets including a first subset of a set of encoded packets, a second feedback message, received from a second UE, that indicates a second set of decoded packets including a second subset of the set of encoded packets. The apparatus may include a second interface configured to output the set of encoded packets; an instruction, to the first UE, to transmit a unicast communication including a set of missed packets to the second UE, where the set of missed packets includes one or more decoded packets of the first set of decoded packets that are not included in the second set of decoded packets.

Another innovative aspect of the subject matter described in this disclosure can be implemented in a non-transitory computer-readable medium. The non-transitory computer-readable medium may store one or more instructions for wireless communication. The one or more instructions, when executed by one or more processors of a BS, may cause the one or more processors to transmit, to a plurality of UEs, a set of encoded packets; receive a plurality of feedback messages from the plurality of UEs, the plurality of feedback messages including: a first feedback message, received from a first UE, that indicates a first set of decoded packets including a first subset of the set of encoded packets, a second feedback message, received from a second UE, that indicates a second set of decoded packets including a second subset of the set of encoded packets, and transmit, to the first UE, an instruction to transmit a unicast communication including a set of missed packets to the second UE, where the set of missed packets includes one or more decoded packets of the first set of decoded packets that are not included in the second set of decoded packets. In some aspects, the non-transitory computer-readable medium may perform or implement any one or more of the aspects described in connection with the method, above or elsewhere herein.

Another innovative aspect of the subject matter described in this disclosure can be implemented in an apparatus for wireless communication. The apparatus may include means for means for transmitting, to a plurality of UEs, a set of encoded packets; means for receiving a plurality of feedback messages from the plurality of UEs, the plurality of feedback messages including: a first feedback message, received from a first UE, that indicates a first set of decoded packets including a first subset of the set of encoded packets, a second feedback message, received from a second UE, that indicates a second set of decoded packets including a second subset of the set of encoded packets, and means for transmitting, to the first UE, an instruction to transmit a unicast communication including a set of missed packets to the second UE, where the set of missed packets includes one or more decoded packets of the first set of decoded packets that are not included in the second set of decoded packets. In some aspects, the apparatus may perform or implement any one or more of the aspects described in connection with the method, above or elsewhere herein.

Aspects generally include a method, apparatus, system, computer program product, non-transitory computer-readable medium, user equipment, base station, wireless communication device, or processing system as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 9 is a diagram illustrating an example process performed, for example, by a BS.

Like reference numbers and designations in the various drawings indicate like elements.

DETAILED DESCRIPTION

Figure 1:
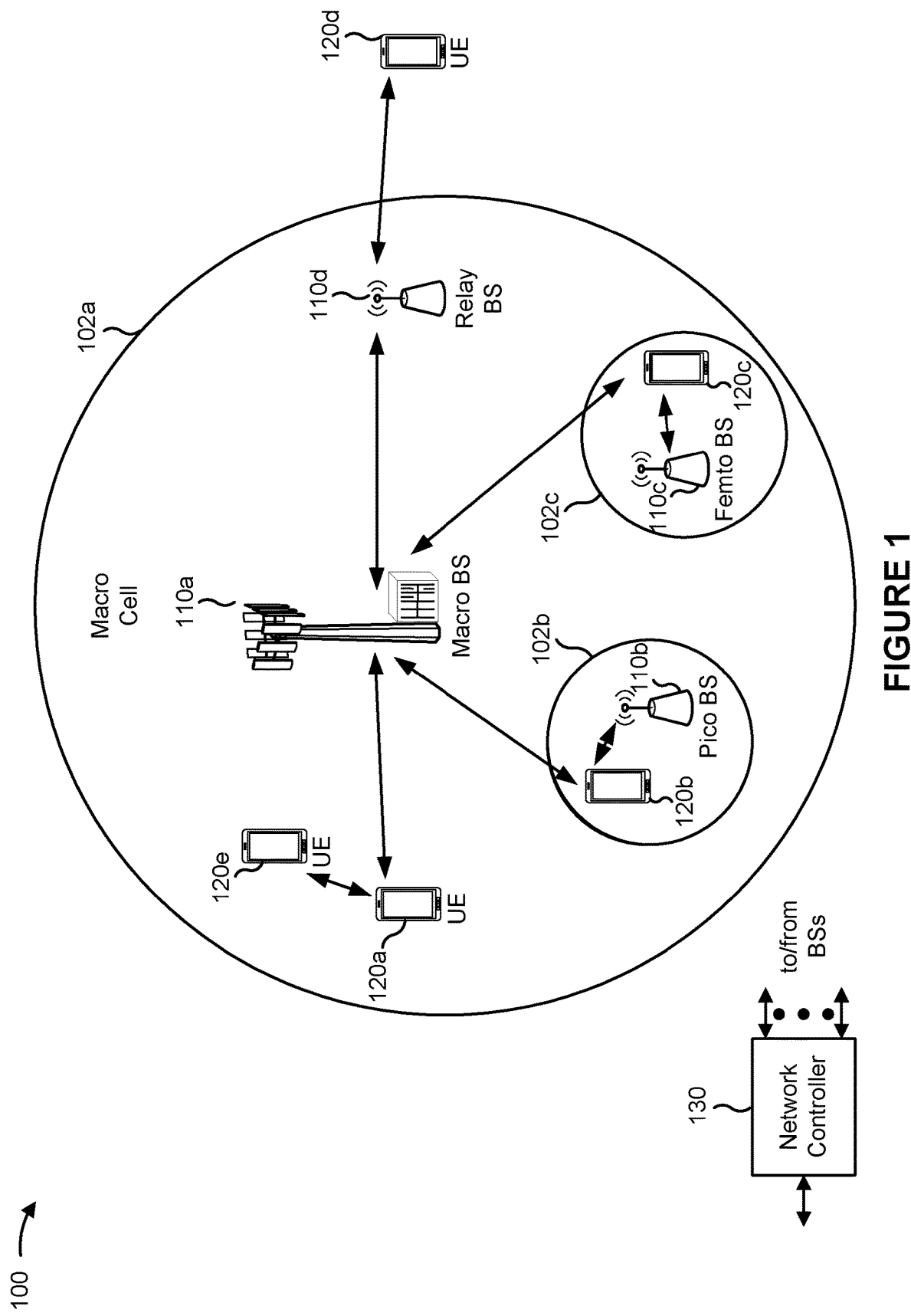
FIG. 1 is a diagram illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In a wireless network, a base station (BS) may communicate with multiple devices, such as various user equipments (UEs). In some cases, a BS may transmit a set of data packets to the UEs by using a network encoding function to encode portions of the set of data packets and broadcast the encoded packets to the UEs. However, the network encoding function may select data packets at random to encode and some of the UEs may not receive or decode each of the transmitted packets in each transmission. To increase delivery of the data packets to the UEs, the BS may encode and transmit portions of the set of data packets many times and, in some cases, an unlimited number of times. As a result, the BS or UEs may consume unnecessary power and generate unnecessary communication traffic handling the repetitive transmissions.

Some aspects described herein provide techniques and apparatuses for sidelink supported network transmission. In some aspects, a BS may transmit a set of encoded packets to a number of UEs and receive feedback messages from the UEs. A feedback message from a UE may indicate a set of decoded packets. Based on the feedback message(s), the BS may determine a group of decoded packets, including the packets that have been decoded by at least one of the UEs. The BS may transmit an updated set of encoded packets based on a difference between a packet pool used to generate the set of encoded packets and the group of decoded packets. In some aspects, the BS may transmit an instruction to a first UE to transmit a sidelink communication to a second UE that includes a set of missed packets. The set of missed packets may include a subset of the set of encoded packets that was decoded by the first UE but not by the second UE. In some aspects, the sidelink communication may be a unicast communication or a broadcast communication.

Particular implementations of the subject matter described in this disclosure can be implemented to realize one or more of the following potential advantages. For example, aspects described may facilitate using unicast sidelink transmissions to proliferate communications from a BS to UEs that did not receive or decode the communications from the BS. Additionally, aspects described herein may facilitate transmitting a portion of a set of encoded packets to UEs, updating the set of encoded packets based on feedback from the UEs indicating which of the transmitted packets were decoded by at least one of the UEs, and transmitting a portion of the updated set of encoded packets to the UEs. Aspects described herein may facilitate instructing UEs to transmit, using sidelink communications, decoded packets to other UEs that did not decode those packets. In this way, rather than retransmitting missed packets from a BS to the UEs, aspects may facilitate using sidelink communications to propagate missed packets to UEs. As a result, aspects described herein may potentially reduce power consumption, latency, and network traffic between a BS and UEs. Aspects described herein also may potentially save wireless resources and increase bandwidth efficiency.

FIG. 1 is a diagram illustrating an example of a wireless network 100. The wireless network 100 may be or may include elements of a 5G New Radio (NR) network, an LTE network, or another type of network. The wireless network 100 may include one or more base stations 110 (shown as BS 110a, BS 110b, BS 110c, and BS 110d) and other network entities. A base station (BS) is an entity that communicates with user equipment (UEs) and also may be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS, a BS subsystem serving this coverage area, or a combination thereof, depending on the context in which the term is used. In some aspects, a BS may include multiple constituent parts. For example, a BS may include a disaggregated random access network (RAN) or Open RAN (O-RAN) BS that may include a number of physical devices distributed across a number of locations. The multiple devices may facilitate distributed resource allocations for supporting access link communications or sidelink communications, among other examples.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

The wireless network 100 may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay base station 110d may communicate with a macro BS 110a and a UE 120d in order to facilitate communication between the macro BS 110a and the UE 120d. A relay base station also may be referred to as a relay BS, a relay base station, a relay, etc.

The wireless network 100 may be a heterogeneous network that includes BSs of different types, such as macro BSs, pico BSs, femto BSs, relay BSs, etc. These different types of BSs may have different transmit power levels, different coverage areas, and different impacts on interference in the wireless network 100. For example, macro BSs may have a high transmit power level (for example, 5 to 40 watts) whereas pico BSs, femto BSs, and relay BSs may have lower transmit power levels (for example, 0.1 to 2 watts).

A network controller 130 may couple to a set of BSs and may provide coordination and control for these BSs. The network controller 130 may communicate with the BSs via a backhaul. The BSs also may communicate with one another, for example, directly or indirectly via a wireless or wireline backhaul.

Multiple UEs 120 (for example, a UE 120a, a UE 120b, a UE 120c, etc.) may be dispersed throughout the wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, or location tags, that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). A UE 120 may be included inside a housing that houses components of the UE 120, such as processor components, memory components, or other components. In some examples, the processor components and the memory components may be coupled together. For example, the processor components (for example, one or more processors) and the memory components (for example, a memory) may be operatively coupled, communicatively coupled, electronically coupled, or electrically coupled, among other examples.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some aspects, two or more UEs 120 (for example, shown as a UE 120a and a UE 120e) may communicate directly using one or more sidelink channels (for example, without using a BS 110 as an intermediary to communicate with one another). For example, the UEs 120 may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or a similar protocol), or a mesh network. In such examples, the UE 120 may perform scheduling operations, resource selection operations, as well as other operations described elsewhere herein as being performed by the BS 110.

Devices of the wireless network 100 may communicate using the electromagnetic spectrum, which may be subdivided based on frequency or wavelength into various classes, bands, or channels. For example, devices of the wireless network 100 may communicate using an operating band having a first frequency range (FR1), which may span from 410 MHz to 7.125 GHz. As another example, devices of the wireless network 100 may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" may broadly represent frequencies less than 6 GHz, frequencies within FR1, mid-band frequencies (for example, greater than 7.125 GHz), or a combination thereof. Similarly, unless specifically stated otherwise, it should be understood that the term "millimeter wave" may broadly represent frequencies within the EHF band, frequencies within FR2, mid-band frequencies (for example, less than 24.25 GHz), or a combination thereof. It is contemplated that the frequencies included in FR1 and FR2 may be modified, and techniques described herein are applicable to those modified frequency ranges.

Figure 2:
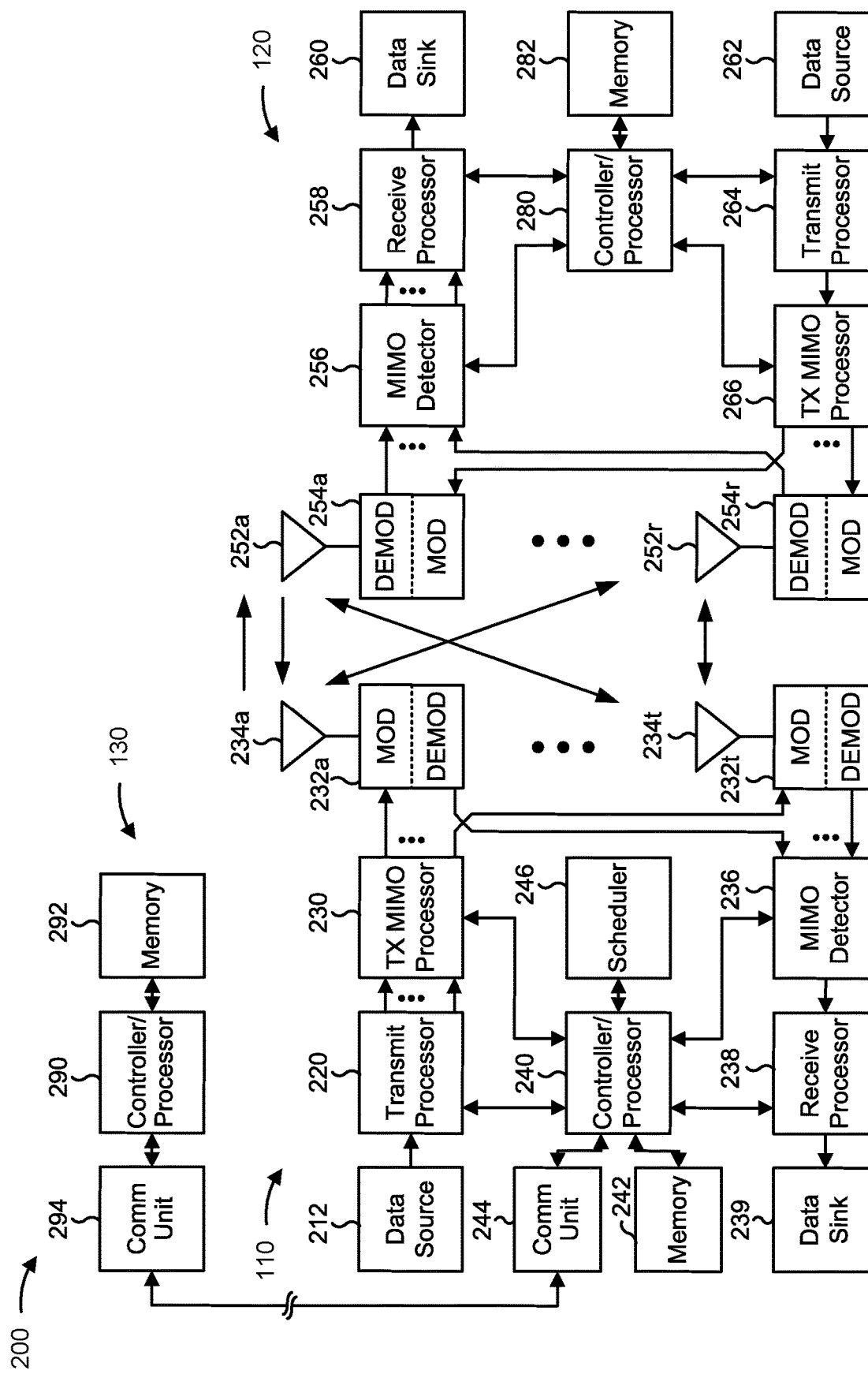
FIG. 2 is a diagram illustrating an example of a base station (BS) in communication with a user equipment (UE) in a wireless network.

FIG. 2 is a diagram illustrating an example 200 of a BS 110 in communication with a UE 120 in a wireless network 100. The BS 110 may be equipped with T antennas 234a through 234t, and the UE 120 may be equipped with R antennas 252a through 252r, where in general T≥1 and R≥1.

At the BS 110, a transmit processor 220 may receive data from a data source 212 for one or more UEs, select one or more modulation and coding schemes (MCS) for each UE based on channel quality indicators (CQIs) received from the UE, process (for example, encode and modulate) the data for each UE based on the MCS(s) selected for the UE, and provide data symbols for all UEs. The transmit processor 220 also may process system information (for example, for semi-static resource partitioning information) and control information (for example, CQI requests, grants, or upper layer signaling) and provide overhead symbols and control symbols. The transmit processor 220 also may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each modulator 232 may process a respective output symbol stream (for example, for OFDM) to obtain an output sample stream. Each modulator 232 may further process (for example, convert to analog, amplify, filter, and upconvert) the output sample stream to obtain a downlink signal. T downlink signals from the modulators 232a through 232t may be transmitted via T antennas 234a through 234t, respectively.

At the UE 120, the antennas 252a through 252r may receive the downlink signals from the BS 110 or other BSs and may provide received signals to the demodulators (DEMODs) 254a through 254r, respectively. Each demodulator 254 may condition (for example, filter, amplify, downconvert, and digitize) a received signal to obtain input samples. Each demodulator 254 may further process the input samples (for example, for OFDM) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some aspects, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the BS 110 via the communication unit 294.

Antennas (such as antennas 234a through 234t and/or antennas 252a through 252r) may include, or may be included within, one or more antenna panels, antenna groups, sets of antenna elements, or antenna arrays, among other examples. An antenna panel, an antenna group, a set of antenna elements, or an antenna array may include one or more antenna elements. An antenna panel, an antenna group, a set of antenna elements, or an antenna array may include a set of coplanar antenna elements or a set of non-coplanar antenna elements. An antenna panel, an antenna group, a set of antenna elements, or an antenna array may include antenna elements within a single housing or antenna elements within multiple housings. An antenna panel, an antenna group, a set of antenna elements, or an antenna array may include one or more antenna elements coupled to one or more transmission or reception components, such as one or more components of FIG. 2.

On the uplink, at the UE 120, a transmit processor 264 may receive and process data from a data source 262 and control information (for example, for reports including RSRP, RSSI, RSRQ, or CQI) from a controller/processor 280. The transmit processor 264 also may generate reference symbols for one or more reference signals. The symbols from the transmit processor 264 may be precoded by a TX MIMO processor 266 if applicable, further processed by the modulators 254a through 254r (for example, for DFT-s-OFDM or CP-OFDM) and transmitted to the BS 110. In some aspects, a modulator and a demodulator (for example, MOD/DEMOD 254) of the UE 120 may be included in a modem of the UE 120. In some aspects, the UE 120 includes a transceiver. The transceiver may include any combination of the antenna(s) 252, the modulators 254, the demodulators 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the BS 110, the uplink signals from the UE 120 and other UEs may be received by the antennas 234, processed by the demodulators 232, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The BS 110 may include a communication unit 244 and may communicate with the network controller 130 via the communication unit 244. The BS 110 may include a scheduler 246 to schedule one or more UEs 120 for downlink communications, uplink communications, or a combination thereof. In some aspects, a modulator and a demodulator (for example, MOD/DEMOD 232) of the BS 110 may be included in a modem of the base station 110. In some aspects, the BS 110 includes a transceiver. The transceiver may include any combination of the antenna(s) 234, the modulators 232, the demodulators 232, the MIMO detector 236, the receive processor 238, the transmit processor 220, or the TX MIMO processor 230. The transceiver may be used by a processor (for example, the controller/processor 240) and a memory 242 to perform aspects of any of the processes described herein.

In some implementations, the controller/processor 280 may be a component of a processing system. A processing system may generally refer to a system or series of machines or components that receives inputs and processes the inputs to produce a set of outputs (which may be passed to other systems or components of, for example, the UE 120). For example, "processing system of the UE 120" may refer to a system including the various other components or subcomponents of the UE 120.

The processing system of the UE 120 may interface with other components of the UE 120, and may process information received from other components (such as inputs or signals), output information to other components, etc. For example, a chip or modem of the UE 120 may include a processing system, a first interface to receive or obtain information, and a second interface to output, transmit or provide information. In some cases, "first interface" may refer to an interface between the processing system of the chip or modem and a receiver, such that the UE 120 may receive information or signal inputs, and the information may be passed to the processing system. In some cases, "second interface" may refer to an interface between the processing system of the chip or modem and a transmitter, such that the UE 120 may transmit information output from the chip or modem. A person having ordinary skill in the art will readily recognize that the second interface also may obtain or receive information or signal inputs, and the first interface also may output, transmit or provide information.

In some implementations, the controller/processor 240 may be a component of a processing system. A processing system may generally refer to a system or series of machines or components that receives inputs and processes the inputs to produce a set of outputs (which may be passed to other systems or components of, for example, the base station 110). For example, "processing system of the BS 110" may refer to a system including the various other components or subcomponents of the BS 110.

The processing system of the BS 110 may interface with other components of the BS 110, and may process information received from other components (such as inputs or signals), output information to other components, etc. For example, a chip or modem of the BS 110 may include a processing system, a first interface to receive or obtain information, and a second interface to output, transmit or provide information. In some cases, "first interface" may refer to an interface between the processing system of the chip or modem and a receiver, such that the BS 110 may receive information or signal inputs, and the information may be passed to the processing system. In some cases, "second interface" may refer to an interface between the processing system of the chip or modem and a transmitter, such that the BS 110 may transmit information output from the chip or modem. A person having ordinary skill in the art will readily recognize that the second interface also may obtain or receive information or signal inputs, and the first interface also may output, transmit or provide information.

The controller/processor 240 of the BS 110, the controller/processor 280 of the UE 120, or any other component(s) of FIG. 2 may perform one or more techniques associated with supporting network transmissions using unicast sidelink communications, as described in more detail elsewhere herein. For example, the controller/processor 240 of the BS 110, the controller/processor 280 of the UE 120, or any other component(s) (or combinations of components) of FIG. 2 may perform or direct operations of, for example, process 700 of FIG. 7, process 800 of FIG. 8, process 900 of FIG. 9, or other processes as described herein. The memory 242 and the memory 282 may store data and program codes for the BS 110 and the UE 120, respectively. In some aspects, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the BS 110 or the UE 120, may cause the one or more processors, the UE 120, or the BS 110 to perform or direct operations of, for example, process 700 of FIG. 7, process 800 of FIG. 8, process 900 of FIG. 9, or other processes as described herein.

In some aspects, the UE 120 may include means for receiving, from a BS, a set of encoded packets, means for transmitting, to the BS, a feedback message that indicates a set of decoded packets, means for receiving, from the base station, an instruction to transmit a unicast sidelink communication including a set of missed packets to a second UE, where the set of missed packets includes one or more decoded packets of the set of decoded packets, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the UE 120 may include means for receiving, from a BS, a set of encoded packets, means for transmitting, to the BS, a feedback message that indicates a first set of decoded packets, means for receiving, from a second UE, a unicast sidelink communication including a set of missed packets, where the set of missed packets includes one or more decoded packets of a second set of decoded packets that are not included in the first set of decoded packets, among other examples, or combinations thereof. In some aspects, such means may include one or more components of the UE 120 described in connection with FIG. 2, such as the controller/processor 280, the transmit processor 264, the TX MIMO processor 266, the MOD 254, one or more antennas 252, the DEMOD 254, the MIMO detector 256, or the receive processor 258.

In some aspects, the BS 110 may include means for transmitting, to a plurality of UEs, a set of encoded packets, means for receiving a plurality of feedback messages from the plurality of UEs, the plurality of feedback messages including: a first feedback message, received from a first UE, that indicates a first set of decoded packets including a first subset of the set of encoded packets, a second feedback message, received from a second UE, that indicates a second set of decoded packets including a second subset of the set of encoded packets, means for transmitting, to the first UE, an instruction to transmit a unicast communication including a set of missed packets to the second UE, where the set of missed packets includes one or more decoded packets of the first set of decoded packets that are not included in the second set of decoded packets, among other examples, or combinations thereof. In some aspects, such means may include one or more components of the BS 110 described in connection with FIG. 2, such as one or more antennas 234, the DEMOD 232, the MIMO detector 236, the receive processor 238, the controller/processor 240, the transmit processor 220, the TX MIMO processor 230, the MOD 232, or the antenna 234, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Figure 3:
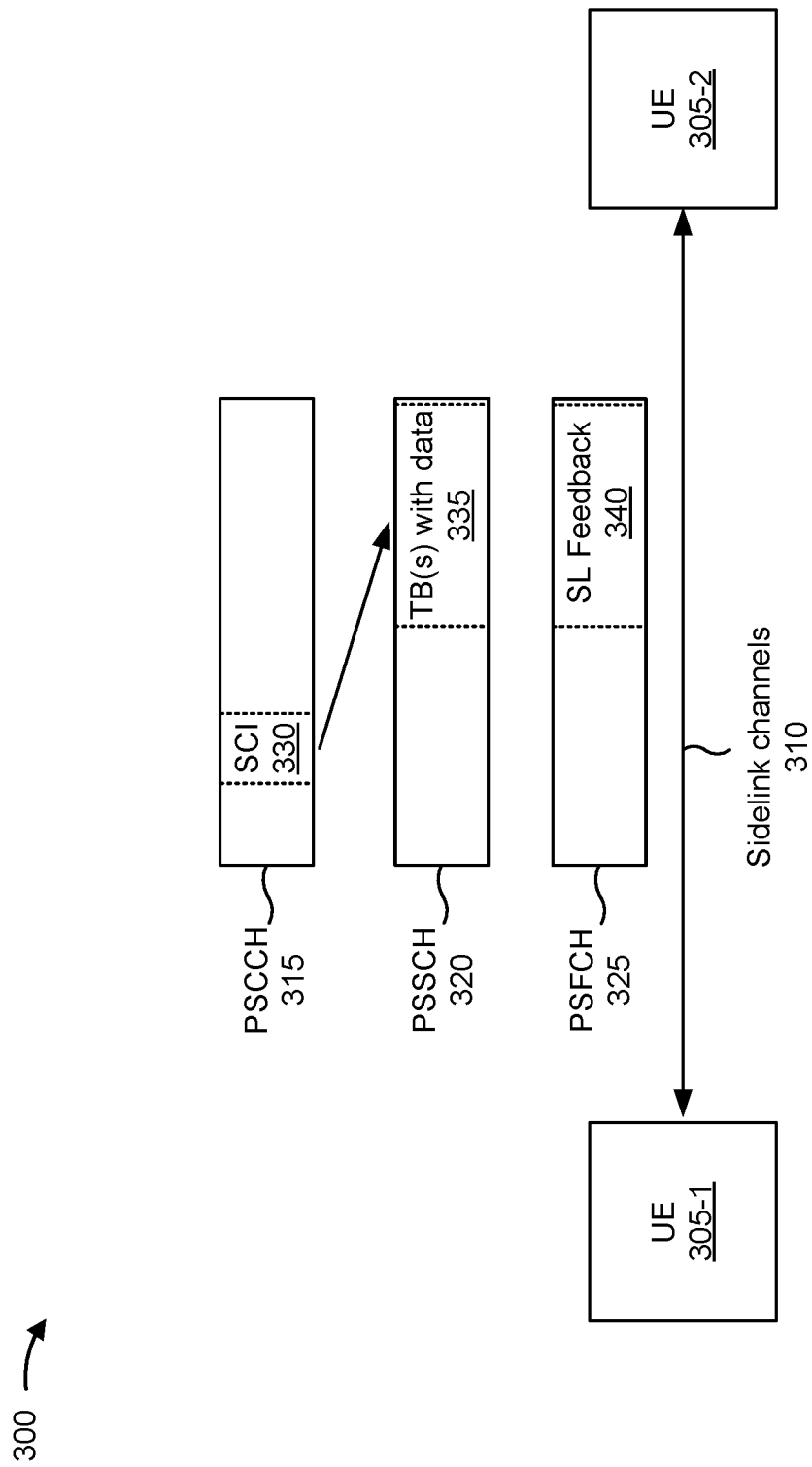
FIG. 3 is a diagram illustrating an example of sidelink communications.

FIG. 3 is a diagram illustrating an example 300 of sidelink communications.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (for example, which may include V2V communications, V2I communications, or V2P communications), or mesh networking. In some aspects, the UEs 305 (for example, UE 305-1 or UE 305-2) may correspond to one or more other UEs described elsewhere herein, such as UE 120. In some aspects, the one or more sidelink channels 310 may use a PC5 interface or may operate in a high frequency band (for example, the 5.9 GHz band). Additionally, or alternatively, the UEs 305 may synchronize timing of transmission time intervals (TTIs) (for example, frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, or a physical sidelink feedback channel (PSFCH) 325. The PSCCH 315 may be used to communicate control information, similar to a physical downlink control channel (PDCCH) or a physical uplink control channel (PUCCH) used for cellular communications with a base station 110 via an access link or an access channel. The PSSCH 320 may be used to communicate data, similar to a physical downlink shared channel (PDSCH) or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (for example, time resources, frequency resources, or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (for example, acknowledgement or negative acknowledgement (ACK/NACK) information), transmit power control (TPC), or a scheduling request (SR).

In some aspects, the one or more sidelink channels 310 may use resource pools. For example, a scheduling assignment (for example, included in SCI 330) may be transmitted in sub-channels using specific resource blocks (RBs) across time. In some aspects, data transmissions (for example, on the PSSCH 320) associated with a scheduling assignment may occupy adjacent RBs in the same subframe as the scheduling assignment (for example, using frequency division multiplexing). In some aspects, a scheduling assignment and associated data transmissions are not transmitted on adjacent RBs.

In some aspects, a UE 305 may operate using a transmission mode where resource selection or scheduling is performed by the UE 305 (for example, rather than a BS 110). In some aspects, the UE 305 may perform resource selection or scheduling by sensing channel availability for transmissions. For example, the UE 305 may measure a received signal strength indicator (RSSI) parameter (for example, a sidelink-RSSI (S-RSSI) parameter) associated with various sidelink channels, may measure a reference signal received power (RSRP) parameter (for example, a PSSCH-RSRP parameter) associated with various sidelink channels, may measure a reference signal received quality (RSRQ) parameter (for example, a PSSCH-RSRQ parameter) associated with various sidelink channels, and may select a channel for transmission of a sidelink communication based at least in part on the measurement(s).

Additionally, or alternatively, the UE 305 may perform resource selection or scheduling using SCI 330 received in the PSCCH 315, which may indicate occupied resources, or channel parameters. Additionally, or alternatively, the UE 305 may perform resource selection or scheduling by determining a channel busy rate (CBR) associated with various sidelink channels, which may be used for rate control (for example, by indicating a maximum number of resource blocks that the UE 305 can use for a particular set of subframes).

In the transmission mode where resource selection or scheduling is performed by a UE 305, the UE 305 may generate sidelink grants, and may transmit the grants in SCI 330. A sidelink grant may indicate, for example, one or more parameters (for example, transmission parameters) to be used for an upcoming sidelink transmission, such as one or more resource blocks to be used for the upcoming sidelink transmission on the PSSCH 320 (for example, for TBs 335), one or more subframes to be used for the upcoming sidelink transmission, or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

Figure 4:
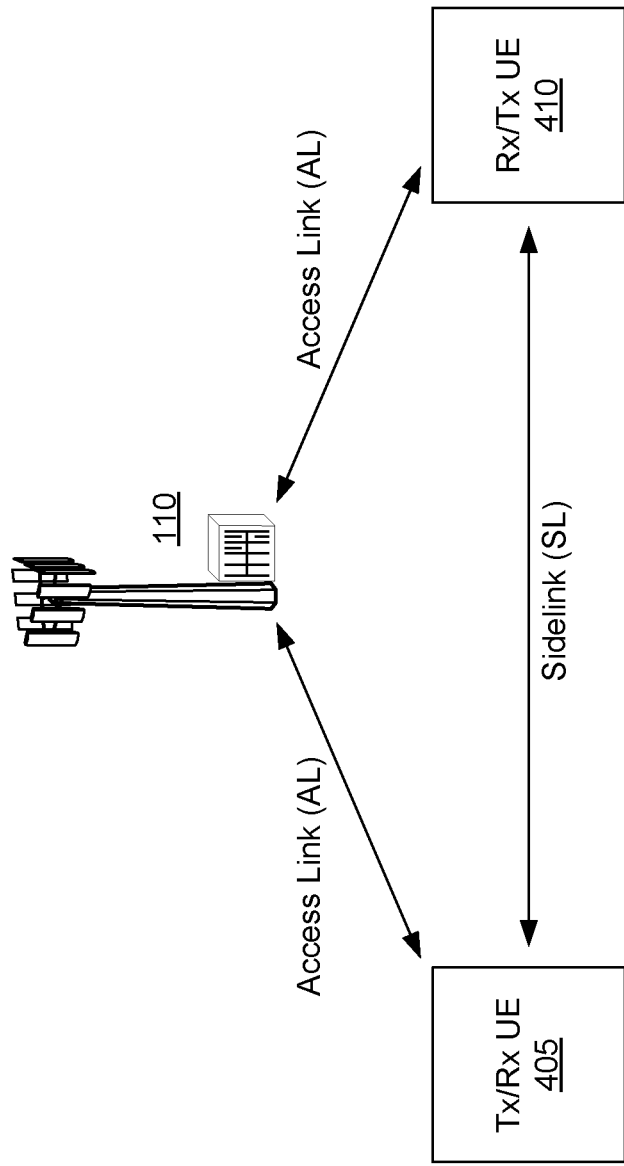
FIG. 4 is a diagram illustrating an example associated with sidelink communications and access link communications.

FIG. 4 is a diagram illustrating an example 400 of sidelink communications and access link communications.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a BS 110 may communicate with the Tx/Rx UE 405 via a first access link. Additionally, or alternatively, in some sidelink modes, the BS 110 may communicate with the Rx UE 410 via a second access link. The Tx/Rx UE 405 and the Rx/Tx UE 410 may correspond to one or more UEs described elsewhere herein, such as the UE 120 of FIG. 1. Thus, a direct link between UEs 120 (for example, via a PC5 interface) may be referred to as a sidelink, and a direct link between a BS 110 and a UE 120 (for example, via a Uu interface) may be referred to as an access link. Sidelink communications may be transmitted via the sidelink, and access link communications may be transmitted via the access link. An access link communication may be either a downlink communication (from a BS 110 to a UE 120) or an uplink communication (from a UE 120 to a BS 110).

Figure 5:
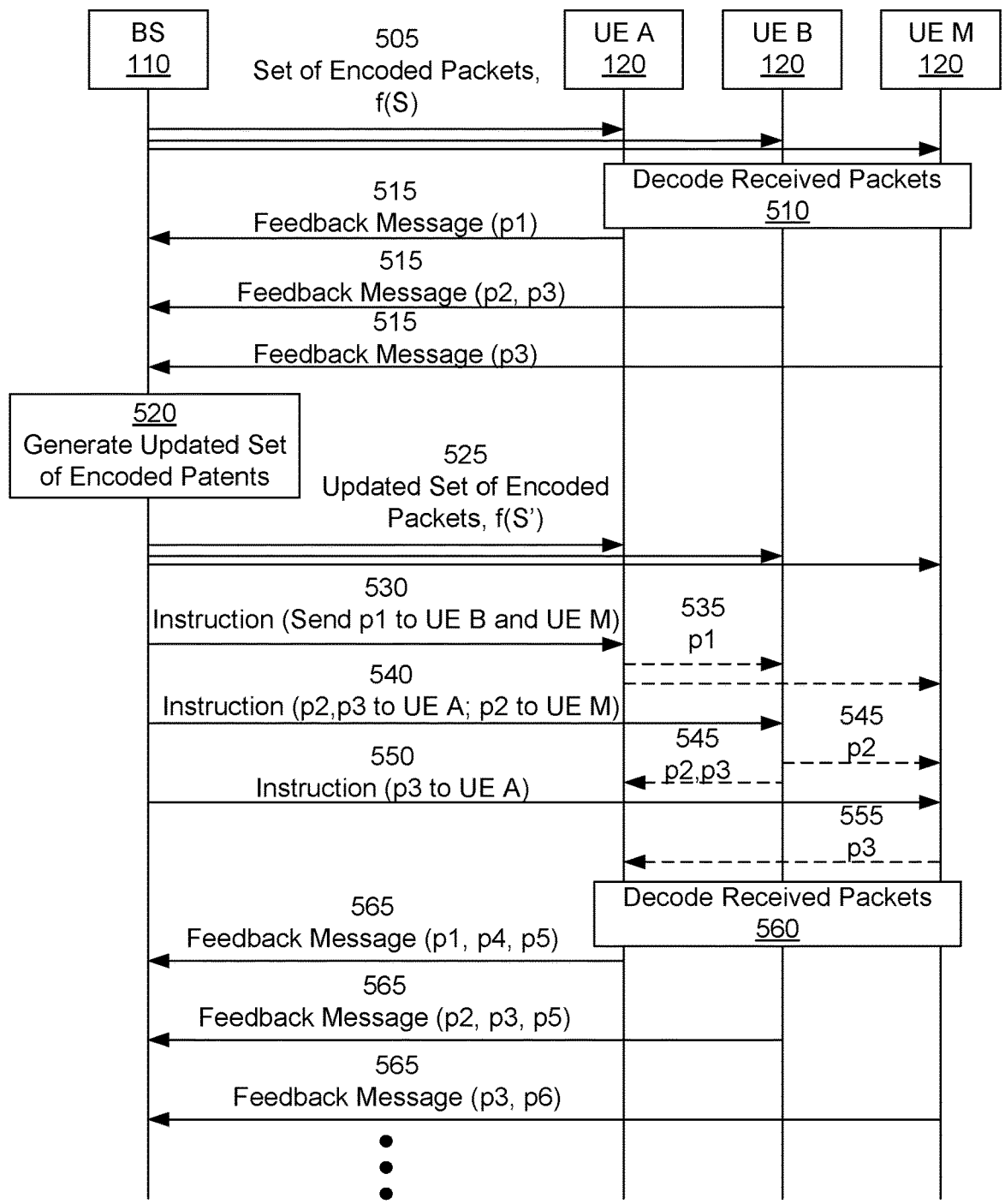
FIGS. 5 and 6 are diagrams illustrating example call flows associated with supporting network transmissions using unicast sidelink communications.

FIG. 5 is a diagram illustrating an example call flow 500. As shown in FIG. 5, a BS 110 (such as the BS 110 depicted in, and described in connection with, FIGS. 1-4) and a number of UEs 120 (shown as UE A, UE B, and UE M) (such as the UE 120 depicted in, and described in connection with, FIGS. 1-4) may communicate with one another. In some aspects, the BS 110 may communicate with the UEs 120 via access link communications and the UEs may communicate with one another via sidelink communications.

As show by reference number 505, the BS 110 may transmit a set of encoded packets to the UEs 120. In some aspects, the BS 110 may generate the set of encoded packets using a network coding encoding function, $f$ that operates on a packet pool, S. For example, the packet pool, S, may include a set, $\{p1, p2, \ldots, pn\}$, of data packets to be sent. For example, the BS 110 may generate a set, $f(S)$, of encoded packets, $\{q1, q2, \ldots, qm\}$, that correspond to a portion, $\{p1, p2, p3\}$, of the packet pool, S. In some aspects, the network coding encoding function may include a random matrix.

The BS 110 may transmit the set of encoded packets using an access link between the BS 110 and each of the UEs 120. Each of the UEs 120 may receive a subset of the set of encoded packets. A subset of encoded packets received by a UE 120 may include different packets than the subset of encoded packets received by another UE 120.

As shown by reference number 510, each of the UEs 120 decodes the encoded packets of the set of encoded packets that are received by the particular UE 120. In some aspects, a UE 120 may decode the received encoded packets using a decoding function corresponding to the encoding function used by the BS 110 to generate the set of encoded packets. In some aspects, the BS 110 may transmit the decoding function to the UEs 120.

In some aspects, the BS 110 may transmit, to a UE 120 (for example, the UE A 120), a network coding configuration. The network coding configuration may include a set of network coding parameters. In some aspects, the set of network coding parameters may indicate a network coding algorithm, an encoding function, an encoding matrix, a maximum number of decoding iterations, or a combination thereof. In some aspects, the network coding configuration may be carried in a medium access control (MAC) control element (MAC-CE), downlink control information (DCI), a radio resource control (RRC) message, or a combination thereof.

In some aspects, network coding configurations may be updated. For example, in some aspects, the BS 110 may determine that a performance of the UE 120 associated with the set of network coding parameters satisfies an underperformance threshold. In some aspects, the BS 110 may determine that the performance of the UE 120 satisfies the underperformance threshold by receiving a network coding parameter change request from the UE 120. In some aspects, the network coding parameter change request may be carried in at least one of a MAC-CE, uplink control information (UCI), or a combination thereof.

In some aspects, the BS 110 may transmit an additional set of network coding parameters to the UE 120 based on determining that the performance of the UE 120 satisfies the underperformance threshold. In some aspects, the additional set of network coding parameters may be carried in at least one of a MAC-CE, DCI, or a combination thereof. In some aspects, the BS 110 may transmit an additional set of network coding parameters to the UE 120 as part of a configuration message and may transmit a network coding parameter switch indication to the UE 120 based on determining that the performance of the UE 120 satisfies the underperformance threshold. In some aspects, the network coding parameter switch indication may be configured to cause the UE 120 to instantiate the additional set of network coding parameters. In some aspects, the network coding parameter switch indication may be carried in at least one of a MAC-CE, DCI, or a combination thereof.

As shown by reference number 515, the UEs 120 may transmit, and the BS 110 may receive, a number of feedback messages. The feedback messages may include feedback indicating the encoded packets that each UE 120 decoded.

For example, the UE A 120 may transmit a first feedback message that indicates a first set of decoded packets including a first subset of the set of encoded packets. As shown, for example, the feedback message from the UE A 120 may indicate that the UE A 120 decoded the packet p1. The UE B 120 may transmit a second feedback message that indicates a second set of decoded packets including a second subset of the set of encoded packets. As shown, for example, the feedback message from the UE B 120 may indicate that the UE B 120 decoded the packets p2 and p3. Similarly, as shown, for example, a feedback message from the UE M 120 may indicate that the UE M 120 decoded the packet p3.

In some aspects, a feedback message may include a packet data convergence protocol (PDCP) status report, a radio link control (RLC) status report, a medium access control (MAC) hybrid automatic repeat request (HARD) feedback message, a dedicated decoding feedback message, or a combination thereof. In some aspects, a dedicated decoding feedback message may include a network coding sub-layer report.

As shown by reference number 520, the BS 110 may generate an updated set of encoded packets. For example, in some aspects, the BS 110 may determine, based on the feedback messages, a group of decoded packets. The BS 110 may generate the updated set of encoded packets based on a difference between the packet pool, S, used to generate the set, ƒ(S), of encoded packets and the group of decoded packets. For example, in some aspects, the BS 110 may generate an updated patent pool, S', by subtracting, from the packet pool, S, each data packet that was decoded by at least one of the UEs 120. The updated set, ƒ(S), of encoded packets may be generated using the same encoding function, ƒ that was used to generate the set, ƒ(S), of encoded packets.

As shown by reference number 525, the BS 110 may transmit, and the UEs 120 may receive, the updated set, ƒ(S), of encoded packets. For example, the BS 110 may generate a set, ƒ(S), of encoded packets, {q'1, q'2, . . . , q'm}, that correspond to a portion, {p4, p5, p6}, of the updated packet pool, S'. As shown by reference number 530, the BS 110 may transmit, to the UE A 120, an instruction to transmit a unicast sidelink communication including a set of missed packets to the UE B 120. In some aspects, an instruction to transmit a unicast sidelink communication may be an instruction to transmit a communication in a unicast manner. As shown in FIG. 5, for example, the set of missed packets (shown as including the packet p1) may include one or more decoded packets of the first set of decoded packets (the set of packets decoded by the UE A 120) that are not included in the second set of decoded packets (the set of packets decoded by the UE B 120).

In some aspects, the instruction also may indicate one or more other transmissions to one or more other UEs. For example, as shown, the instruction also instructs the UE A 120 to transmit a unicast sidelink communication including a set of missed packets (shown as including the packet p1) to the UE M 120. In some aspects, the BS 110 may transmit the instruction to the UE A 120 using a unicast transmission, which may include a transmission that is transmitted in a unicast manner.

Based on the instruction, as shown by reference number 535, the UE A 120 may transmit the set of missing packets (packet p1) to the UE B 120 and the UE M 120. In some aspects, the UE A 120 may transmit the set of missing packets using a unicast sidelink communication. In some aspects, the BS 110 may transmit a sidelink configuration to the UE A 120 and the instruction may be based on the sidelink configuration. In some aspects, the sidelink configuration may indicate a sidelink transmission resource, a frequency configuration, or a modulation and coding scheme (MCS) pool, among other examples. In some aspects, the instruction also may be based on a sidelink topology associated with the UE A 120. In some aspects, the BS 110 may receive an indication of the sidelink topology from the UE A 120. In some aspects, the sidelink topology may indicate any number of sidelink connections between the UE A 120 and any number of other UEs. For example, the sidelink topology may indicate a sidelink connection between the UE A 120 and the UE B 120. In some aspects, based on determining a change to the sidelink topology, the UE A 120 may transmit, and the BS 110 may receive, an update to the sidelink topology. In some aspects, the BS 110 may receive indications of sidelink topologies from any of the UEs 120.

According to various aspects, the BS 110 may transmit any number of instructions to UEs 120. For example, as shown by reference number 540, the BS 110 may transmit, to the UE B 120, an instruction to transmit a unicast sidelink communication including a set of missed packets to the UE A 120 and to transmit a unicast sidelink communication including a set of missed packets to the UE M 120. As shown, for example, the BS 110 may instruct the UE B 120 to transmit the packets p2 and p3 to the UE A 120 and the packet p2 to the UE M 120. As shown by reference number 545, based on the instruction, the UE B 120 may transmit a set of missing packets (the packets p2 and p3) to the UE A 120 and a set of missing packets (the packet p2) to the UE M 120.

As shown by reference number 550, the BS 110 may transmit, to the UE M 120, an instruction to transmit a unicast sidelink communication including a set of missed packets to the UE A 120. As shown, for example, the BS 110 may instruct the UE M 120 to transmit the packet p3 to the UE A 120. As shown by reference number 555, based on the instruction, the UE M 120 may transmit a set of missing packets (the packet p3) to the UE A 120.

As shown by reference number 560, each UE 120 may decode received encoded packets. For example, in some aspects, a UE 120 may decode a subset of the updated set of encoded packets received by that UE 120 and a set of missed packets received from another UE 120 via a sidelink communication. As shown by reference number 565, the UEs 120 may transmit, and the BS 110 may receive, feedback messages that indicate respective sets of decoded packets. For example, the UE A 120 may transmit a feedback message that indicates that the UE A 120 has decoded the packets p1, p4, and p5. The UE B 120 may transmit a feedback message that indicates that the UE B 120 has decoded the packets p2, p3, and p5. The UE M 120 may transmit a feedback message that indicates that the UE M 120 has decoded the packets p3 and p6. According to various aspects, the procedure shown in FIG. 5 may be repeated until each of the UEs have decoded the packets of the packet pool, S.

Figure 6:
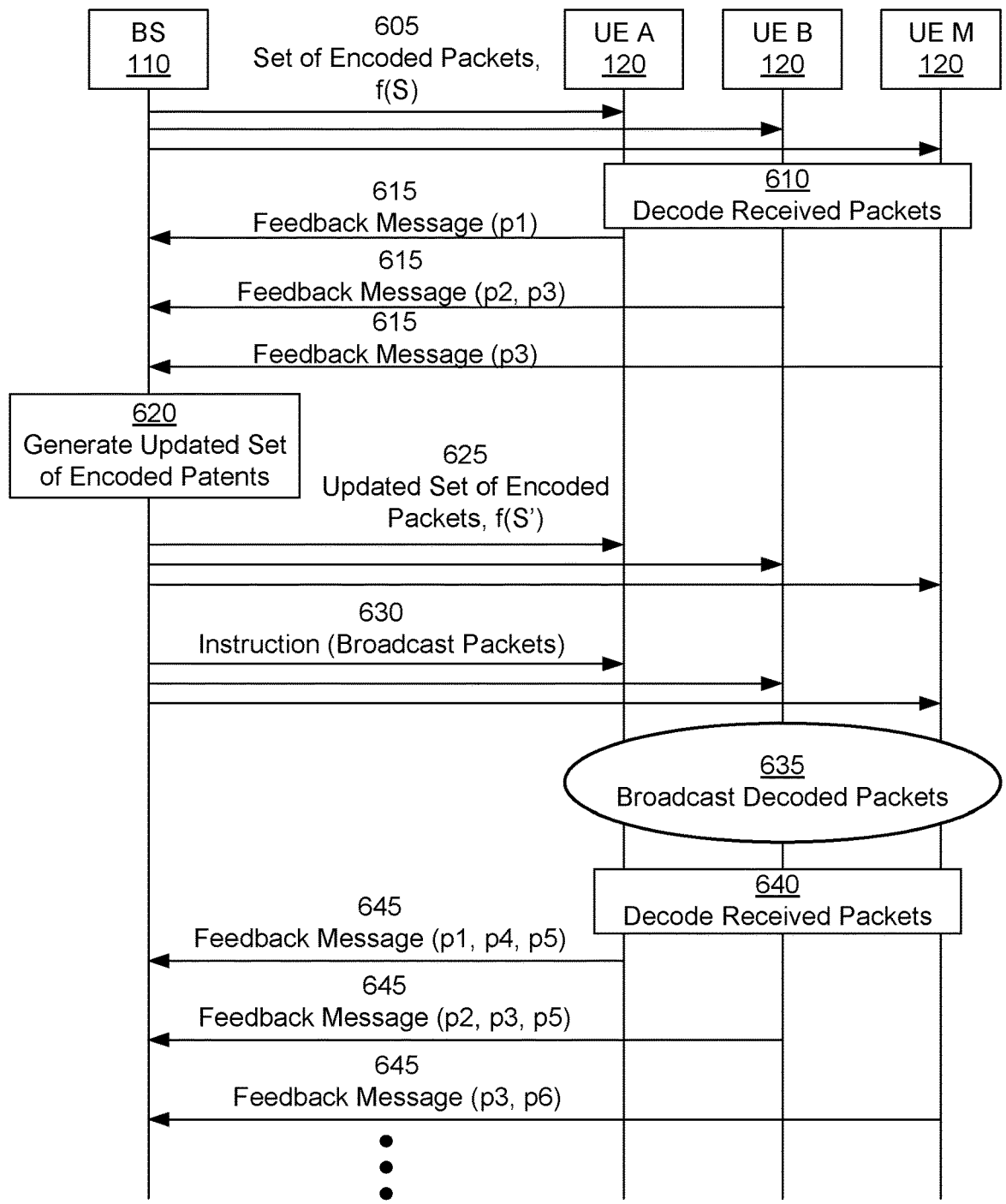

FIG. 6 is a diagram illustrating an example call flow 600. As shown in FIG. 6, a BS 110 (such as the BS 110 depicted in, and described in connection with, FIGS. 1-5) and a number of UEs 120 (shown as UE A, UE B, and UE M) (such as the UE 120 depicted in, and described in connection with, FIGS. 1-5) may communicate with one another. In some aspects, the BS 110 may communicate with the UEs 120 via access link communications and the UEs 120 may communicate with one another via sidelink communications.

As show by reference number 605, the BS 110 may transmit a set of encoded packets to the UEs 120 (shown, for example, as packets p1, p2, and p3). In some aspects, the BS 110 may generate the set of encoded packets using a network coding encoding function, $f$, that operates on a packet pool, S. For example, the packet pool, S, may include a set, {p1, p2, ..., pn}, of data packets to be sent. For example, the BS 110 may generate a set, $f(S)$, of encoded packets, {q1, q2, ..., qm}, that correspond to a portion, {p1, p2, p3}, of the packet pool, S. In some aspects, the network coding encoding function may include a random matrix.

The BS 110 may transmit the set of encoded packets using an access link between the BS 110 and each of the UEs 120. Each of the UEs 120 may receive a subset of the set of encoded packets. A subset of encoded packets received by a UE 120 may include different packets than the subset of encoded packets received by another UE 120.

As shown by reference number 610, each of the UEs 120 decodes the encoded packets of the set of encoded packets that are received by the particular UE 120. In some aspects, a UE 120 may decode the received encoded packets using a decoding function corresponding to the encoding function used by the BS 110 to generate the set of encoded packets. In some aspects, the BS 110 may transmit the decoding function to the UEs 120.

In some aspects, the BS 110 may transmit, to a UE 120 (for example, the UE A 120), a network coding configuration. The network coding configuration may include a set of network coding parameters. In some aspects, the set of network coding parameters may indicate at least one of a network coding algorithm, an encoding function, an encoding matrix, a maximum number of decoding iterations, or a combination thereof. In some aspects, the network coding configuration may be carried in at least one of a MAC-CE, DCI, an RRC message, or a combination thereof.

In some aspects, network coding configurations may be updated. For example, in some aspects, the BS 110 may determine that a performance of the UE 120 associated with the set of network coding parameters satisfies an underperformance threshold. In some aspects, the BS 110 may determine that the performance of the UE 120 satisfies the underperformance threshold by receiving a network coding parameter change request from the UE 120. In some aspects, the network coding parameter change request may be carried in at least one of a MAC-CE, UCI, or a combination thereof.

In some aspects, the BS 110 may transmit an additional set of network coding parameters to the UE 120 based on determining that the performance of the UE 120 satisfies the underperformance threshold. In some aspects, the additional set of network coding parameters may be carried in at least one of a MAC-CE, DCI, or a combination thereof. In some aspects, the BS 110 may transmit an additional set of network coding parameters to the UE 120 as part of a configuration message and may transmit a network coding parameter switch indication to the UE 120 based on determining that the performance of the UE 120 satisfies the underperformance threshold. In some aspects, the network coding parameter switch indication may be configured to cause the UE 120 to instantiate the additional set of network coding parameters. In some aspects, the network coding parameter switch indication may be carried in at least one of a MAC-CE, DCI, or a combination thereof.

As shown by reference number 615, the UEs 120 may transmit, and the BS 110 may receive, a number of feedback messages. The feedback messages may include feedback indicating the encoded packets that each UE 120 decoded. For example, the UE A 120 may transmit a first feedback message that indicates a first set of decoded packets including a first subset of the set of encoded packets. As shown, for example, the feedback message from the UE A 120 may indicate that the UE A 120 decoded the packet p1. The UE B 120 may transmit a second feedback message that indicates a second set of decoded packets including a second subset of the set of encoded packets. As shown, for example, the feedback message from the UE B 120 may indicate that the UE B 120 decoded the packets p2 and p3. Similarly, as shown, for example, a feedback message from the UE M 120 may indicate that the UE M 120 decoded the packet p3.

In some aspects, a feedback message may include a PDCP status report, an RLC status report, a MAC HARQ feedback message, a dedicated decoding feedback message, or a combination thereof. In some aspects, a dedicated decoding feedback message may include a network coding sub-layer report.

As shown by reference number 620, the BS 110 may generate an updated set of encoded packets. For example, in some aspects, the BS 110 may determine, based on the feedback messages, a group of decoded packets. The BS 110 may generate the updated set of encoded packets based on a difference between the packet pool, S, used to generate the set, $f(S)$, of encoded packets and the group of decoded packets. For example, in some aspects, the BS 110 may generate an updated patent pool, S', by subtracting, from the packet pool, S, each data packet that was decoded by at least one of the UEs 120. The updated set, $f(S)$, of encoded packets may be generated using the same encoding function, $f$ that was used to generate the set, $f(S)$, of encoded packets.

As shown by reference number 625, the BS 110 may transmit, and the UEs 120 may receive, the updated set, $f(S)$, of encoded packets. For example, the BS 110 may generate a set, $f(S)$, of encoded packets, {q'1, q'2, ..., q'm}, that correspond to a portion, {p4, p5, p6}, of the updated packet pool, S'. As shown by reference number 630, the BS 110 may transmit, to the UE A 120, the UE B 120, and the UE M 120, an instruction to transmit a broadcast sidelink communication including a set of missed packets to the UE B 120. In some aspects, an instruction to transmit a broadcast sidelink communication may be an instruction to transmit a communication in a broadcast manner. As shown in FIG. 6, for example, the set of missed packets may include one or more decoded packets of the first set of decoded packets that are not included in the second set of decoded packets. In some aspects, the BS 110 may transmit the instructions to the UEs 120 using unicast transmissions, which may include transmissions that are transmitted in a unicast manner.

Based on the instructions, as shown by reference number 635, the UE A 120, the UE B 120, and the UE M 120 may transmit respective sets of missing packets to the other UEs 120 using broadcast communications. In some aspects, the BS 110 may transmit sidelink configurations to one or more of the UEs 120 and the instructions may be based on the sidelink configurations. In some aspects, the instructions also may be based on one or more sidelink topologies associated with one or more of the UEs 120. In some aspects, the BS 110 may receive an indication of the sidelink topology from a UE 120. In some aspects, the sidelink topology may indicate any number of sidelink connections between the UE 120 and any number of other UEs. For example, the sidelink topology may indicate a sidelink connection between the UE A 120 and the UE B 120. In some aspects, based on determining a change to the sidelink topology, a UE 120 may transmit, and the BS 110 may receive, an update to the sidelink topology.

As shown by reference number 640, each UE 120 may decode received encoded packets. For example, in some aspects, a UE 120 may decode a subset of the updated set of encoded packets received by that UE 120 and a set of missed packets received from another UE 120 via a sidelink communication. As shown by reference number 645, the UEs 120 may transmit, and the BS 110 may receive, feedback messages that indicate respective sets of decoded packets. For example, the UE A 120 may transmit a feedback message that indicates that the UE A 120 has decoded the packets p1, p4, and p5. The UE B 120 may transmit a feedback message that indicates that the UE B 120 has decoded the packets p2, p3, and p5. The UE M 120 may transmit a feedback message that indicates that the UE M 120 has decoded the packets p3 and p6. According to various aspects, the procedure shown in FIG. 6 may be repeated until each of the UEs have decoded the packets of the packet pool, S.

Figure 7:
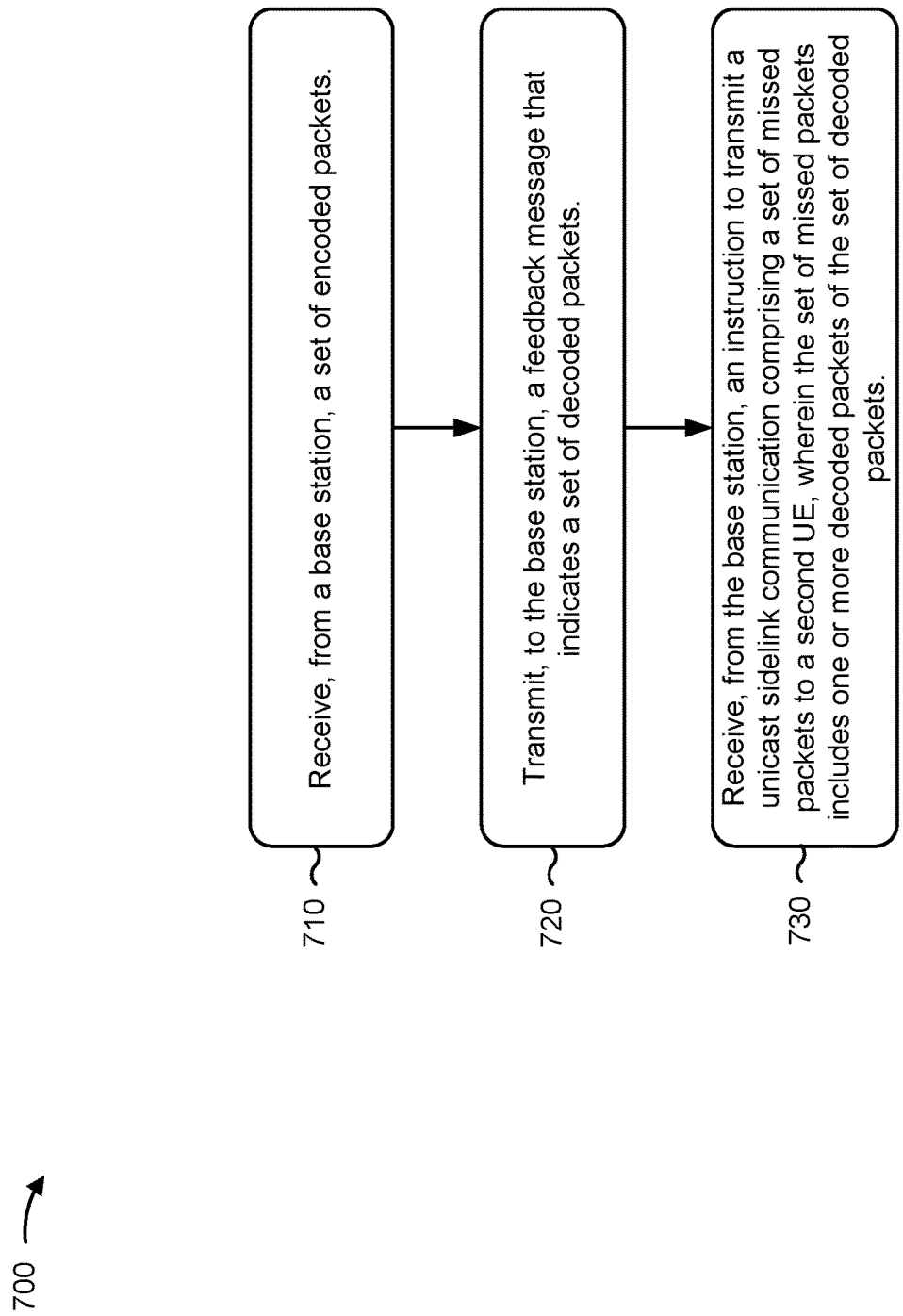
FIGS. 7 and 8 are diagrams illustrating example processes performed, for example, by a UE.

FIG. 7 is a diagram illustrating an example process 700 performed, for example, by a UE. The process 700 is an example where the UE (such as the UE 120 depicted in, and described in connection with, FIGS. 1-6) performs operations associated with sidelink supported network transmission.

As shown in FIG. 7, in some aspects, the process 700 may include receiving, from a BS (such as the BS 110 depicted in, and described in connection with, FIGS. 1-6), a set of encoded packets (block 710). For example, the UE (for example, using receive processor 258, transmit processor 264, controller/processor 280, memory 282, or a combination thereof) may receive, from a B S, a set of encoded packets, as described above.

As shown in FIG. 7, in some aspects, the process 700 may include transmitting, to the BS, a feedback message that indicates a set of decoded packets (block 720). For example, the UE (for example, using receive processor 258, transmit processor 264, controller/processor 280, memory 282, or a combination thereof) may transmit, to the BS, a feedback message that indicates a set of decoded packets, as described above.

As shown in FIG. 7, in some aspects, the process 700 may include receiving, from the BS, an instruction to transmit a unicast sidelink communication including a set of missed packets to a second UE, where the set of missed packets includes one or more decoded packets of the set of decoded packets (block 730). For example, the UE (for example, using receive processor 258, transmit processor 264, controller/processor 280, memory 282, or a combination thereof) may receive, from the BS, an instruction to transmit a unicast sidelink communication including a set of missed packets to a second UE, as described above. In some aspects, the set of missed packets includes one or more decoded packets of the set of decoded packets.

The process 700 may include additional aspects, such as any single aspect or any combination of aspects described below or in connection with one or more other processes described elsewhere herein.

In a first aspect, process 700 includes transmitting the unicast sidelink communication to the second UE.

In a second additional aspect, alone or in combination with the first aspect, process 700 includes receiving, from the BS, an updated set of encoded packets based on the feedback message.

In a third additional aspect, alone or in combination with one or more of the first and second aspects, process 700 includes decoding the set of encoded packets using a decoding function corresponding to an encoding function used to generate the set of encoded packets; and decoding the updated set of encoded packets using the decoding function.

In a fourth additional aspect, alone or in combination with one or more of the first through third aspects, the encoding function includes a random matrix, and process 700 includes receiving an indication of the random matrix from the BS.

In a fifth additional aspect, alone or in combination with one or more of the first through fourth aspects, process 700 includes transmitting, to the BS, an additional feedback message, where the additional feedback message indicates a second set of decoded packets including a subset of the updated set of encoded packets.

In a sixth additional aspect, alone or in combination with one or more of the first through fifth aspects, receiving the instruction includes receiving a unicast transmission from the BS.

In a seventh additional aspect, alone or in combination with one or more of the first through sixth aspects, receiving the set of encoded packets includes receiving the set of encoded packets using an access link between the BS and the first UE.

In an eighth additional aspect, alone or in combination with one or more of the first through seventh aspects, process 700 includes receiving, from the BS, a sidelink configuration.

In a ninth additional aspect, alone or in combination with one or more of the first through eighth aspects, the sidelink configuration indicates at least one of: a sidelink transmission resource, a frequency configuration, or an MCS pool.

In a tenth additional aspect, alone or in combination with one or more of the first through ninth aspects, the instruction is based on the sidelink configuration.

In an eleventh additional aspect, alone or in combination with one or more of the first through tenth aspects, process 700 includes transmitting, to the BS, an indication of a sidelink topology that indicates a sidelink connection between the first UE and the second UE.

In a twelfth additional aspect, alone or in combination with one or more of the first through ninth aspects, process 700 includes transmitting, to the BS, an indication of an update to the sidelink topology.

In a thirteenth additional aspect, alone or in combination with one or more of the first through twelfth aspects, process 700 includes receiving, from the BS, a network coding configuration including a set of network coding parameters.

In a fourteenth additional aspect, alone or in combination with one or more of the first through thirteenth aspects, the set of network coding parameters indicate at least one of a network coding algorithm, an encoding function, an encoding matrix, a maximum number of decoding iterations, or a combination thereof.

In a fifteenth additional aspect, alone or in combination with one or more of the first through fourteenth aspects, the network coding configuration is carried in at least one of a MAC-CE, DCI, an RRC message, or a combination thereof.

In a sixteenth additional aspect, alone or in combination with one or more of the first through fifteenth aspects, process 700 includes determining that a performance of the first UE associated with the set of network coding parameters satisfies an underperformance threshold; and transmitting, to the BS, a network coding parameter change request based on determining that the performance of the first UE satisfies the underperformance threshold.

In a seventeenth additional aspect, alone or in combination with one or more of the first through sixteenth aspects, the network coding parameter change request is carried in at least one of a MAC-CE, UCI, or a combination thereof.

In an eighteenth additional aspect, alone or in combination with one or more of the first through seventeenth aspects, process 700 includes receiving an additional set of network coding parameters from the BS based on the network coding parameter change request.

In a nineteenth additional aspect, alone or in combination with one or more of the first through eighteenth aspects, the additional set of network coding parameters is carried in at least one of a MAC-CE, DCI, or a combination thereof.

In a twentieth additional aspect, alone or in combination with one or more of the first through nineteenth aspects, process 700 includes receiving an additional set of network coding parameters from the BS; receiving a network coding parameter switch indication from the BS based on the network coding parameter change request; and instantiating, based on the network coding parameter switch indication, the additional set of network coding parameters.

In a twenty-first additional aspect, alone or in combination with one or more of the first through twentieth aspects, the network coding parameter switch indication is carried in at least one of a MAC-CE, DCI, or a combination thereof.

In a twenty-second additional aspect, alone or in combination with one or more of the first through twenty-first aspects, the feedback message includes at least one of: a PDCP status report, an RLC status report, a MAC HARQ feedback message, a dedicated decoding feedback message, or a combination thereof.

In a twenty-third additional aspect, alone or in combination with one or more of the first through twenty-second aspects, the dedicated decoding feedback message includes a network coding sub-layer report.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
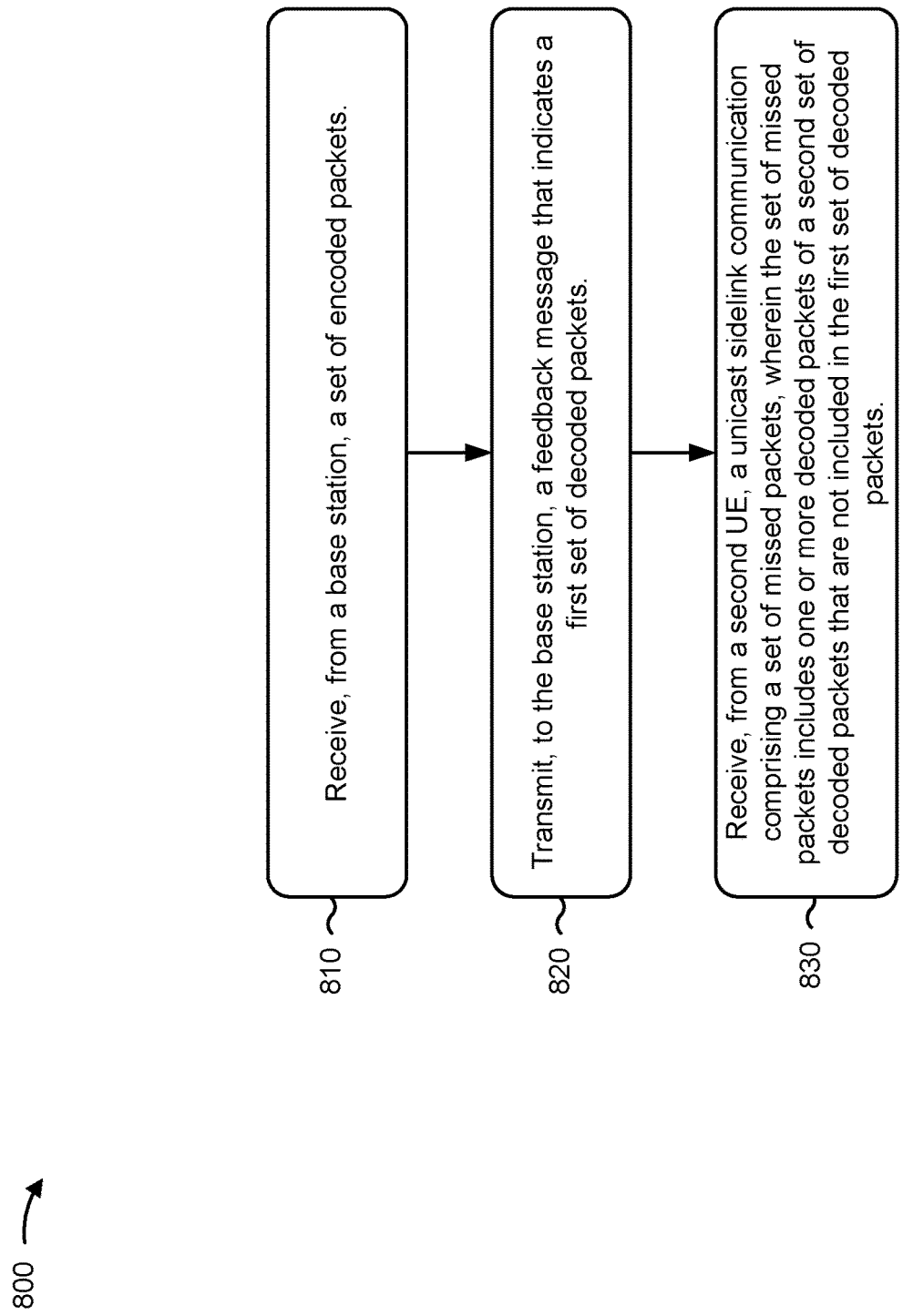

FIG. 8 is a diagram illustrating an example process 800 performed, for example, by a UE. The process 800 is an example where the UE (such as the UE 120 depicted in, and described in connection with, FIGS. 1-6) performs operations associated with sidelink supported network transmission.

As shown in FIG. 8, in some aspects, the process 800 may include receiving, from a BS (such as the BS 110 depicted in, and described in connection with, FIGS. 1-6), a set of encoded packets (block 810). For example, the UE (for example, using receive processor 258, transmit processor 264, controller/processor 280, memory 282, or a combination thereof) may receive, from a B S, a set of encoded packets, as described above.

As shown in FIG. 8, in some aspects, the process 800 may include transmitting, to the BS, a feedback message that indicates a first set of decoded packets (block 820). For example, the UE (for example, using receive processor 258, transmit processor 264, controller/processor 280, memory 282, or a combination thereof) may transmit, to the BS, a feedback message that indicates a first set of decoded packets, as described above.

As shown in FIG. 8, in some aspects, the process 800 may include receiving, from a second UE, a unicast sidelink communication including a set of missed packets, where the set of missed packets includes one or more decoded packets of a second set of decoded packets that are not included in the first set of decoded packets (block 830). For example, the UE (for example, using receive processor 258, transmit processor 264, controller/processor 280, memory 282, or a combination thereof) may receive, from a second UE, a unicast sidelink communication including a set of missed packets, as described above. In some aspects, the set of missed packets includes one or more decoded packets of a second set of decoded packets that are not included in the first set of decoded packets.

The process 800 may include additional aspects, such as any single aspect or any combination of aspects described below or in connection with one or more other processes described elsewhere herein.

In a first aspect, process 800 includes receiving, from the BS, an updated set of encoded packets based on the feedback message.

In a second additional aspect, alone or in combination with the first aspect, process 800 includes decoding the set of encoded packets using a decoding function corresponding to an encoding function used to generate the set of encoded packets; and decoding the updated set of encoded packets using the decoding function.

In a third additional aspect, alone or in combination with one or more of the first and second aspects, the encoding function includes a random matrix, and process 800 includes receiving an indication of the random matrix from the BS.

In a fourth additional aspect, alone or in combination with one or more of the first through third aspects, the transmitting, to the BS, an additional feedback message, where the additional feedback message indicates a third set of decoded packets including a subset of the updated set of encoded packets.

In a fifth additional aspect, alone or in combination with one or more of the first through fourth aspects, receiving the set of encoded packets includes receiving the set of encoded packets using an access link between the BS and the first UE.

In a sixth additional aspect, alone or in combination with one or more of the first through fifth aspects, process 800 includes receiving, from the BS, a sidelink configuration.

In a seventh additional aspect, alone or in combination with one or more of the first through sixth aspects, the sidelink configuration indicates at least one of: a sidelink transmission resource, a frequency configuration, or an MCS pool.

In an eighth additional aspect, alone or in combination with one or more of the first through seventh aspects, the unicast sidelink communication is based on the sidelink configuration.

In a ninth additional aspect, alone or in combination with one or more of the first through eighth aspects, process 800 includes transmitting, to the BS, an indication of a sidelink topology that indicates a sidelink connection between the first UE and the second UE.

In a tenth additional aspect, alone or in combination with one or more of the first through ninth aspects, process 800 includes transmitting, to the BS, an indication of an update to the sidelink topology.

In an eleventh additional aspect, alone or in combination with one or more of the first through tenth aspects, process 800 includes receiving, from the BS, a network coding configuration including a set of network coding parameters.

In a twelfth additional aspect, alone or in combination with one or more of the first through eleventh aspects, the set of network coding parameters indicate at least one of a network coding algorithm, an encoding function, an encoding matrix, a maximum number of decoding iterations, or a combination thereof.

In a thirteenth additional aspect, alone or in combination with one or more of the first through twelfth aspects, the network coding configuration is carried in at least one of a MAC-CE, DCI, an RRC message, or a combination thereof.

In a fourteenth additional aspect, alone or in combination with one or more of the first through thirteenth aspects, process 800 includes determining that a performance of the first UE associated with the set of network coding parameters satisfies an underperformance threshold; and transmitting, to the BS, a network coding parameter change request based on determining that the performance of the first UE satisfies the underperformance threshold.

In a fifteenth additional aspect, alone or in combination with one or more of the first through fourteenth aspects, the network coding parameter change request is carried in at least one of a MAC-CE, UCI, or a combination thereof.

In a sixteenth additional aspect, alone or in combination with one or more of the first through fifteenth aspects, process 800 includes receiving an additional set of network coding parameters from the BS based on the network coding parameter change request.

In a seventeenth additional aspect, alone or in combination with one or more of the first through sixteenth aspects, the additional set of network coding parameters is carried in at least one of a MAC-CE, DCI, or a combination thereof.

In an eighteenth additional aspect, alone or in combination with one or more of the first through seventeenth aspects, process 800 includes receiving an additional set of network coding parameters from the BS; receiving a network coding parameter switch indication from the BS based on the network coding parameter change request; and instantiating, based on the network coding parameter switch indication, the additional set of network coding parameters.

In a nineteenth additional aspect, alone or in combination with one or more of the first through eighteenth aspects, the network coding parameter switch indication is carried in at least one of a MAC-CE, DCI, or a combination thereof.

In a twentieth additional aspect, alone or in combination with one or more of the first through nineteenth aspects, the feedback message includes at least one of a PDCP status report, an RLC status report, a MAC HARQ feedback message, a dedicated decoding feedback message, or a combination thereof.

In a twenty-first additional aspect, alone or in combination with one or more of the first through twentieth aspects, the dedicated decoding feedback message includes a network coding sub-layer report.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

FIG. 9 is a diagram illustrating an example process 900 performed, for example, by a BS. The process 900 is an example where the BS (such as the BS 110 depicted in, and described in connection with, FIGS. 1-6) performs operations associated with sidelink supported network transmission.

As shown in FIG. 9, in some aspects, the process 900 may include transmitting, to a plurality of UEs (such as the UE 120 depicted in, and described in connection with, FIGS. 1-6), a set of encoded packets (block 910). For example, the BS (for example, using transmit processor 220, receive processor 238, controller/processor 240, memory 242, or a combination thereof) may transmit, to a plurality of UEs, a set of encoded packets, as described above.

As shown in FIG. 9, in some aspects, the process 900 may include receiving a plurality of feedback messages from the plurality of UEs, the plurality of feedback messages including: a first feedback message, received from a first UE, that indicates a first set of decoded packets including a first subset of the set of encoded packets, a second feedback message, received from a second UE, that indicates a second set of decoded packets including a second subset of the set of encoded packets (block 920). For example, the BS (for example, using transmit processor 220, receive processor 238, controller/processor 240, memory 242, or a combination thereof) may receive a plurality of feedback messages from the plurality of UEs, the plurality of feedback messages including, as described above. In some aspects, the plurality of feedback messages include: a first feedback message, received from a first UE, that indicates a first set of decoded packets including a first subset of the set of encoded packets, a second feedback message, received from a second UE, that indicates a second set of decoded packets including a second subset of the set of encoded packets, as described above.

As shown in FIG. 9, in some aspects, the process 900 may include transmitting, to the first UE, an instruction to transmit a unicast communication including a set of missed packets to the second UE, where the set of missed packets includes one or more decoded packets of the first set of decoded packets that are not included in the second set of decoded packets (block 930). For example, the BS (for example, using transmit processor 220, receive processor 238, controller/processor 240, memory 242, or a combination thereof) may transmit, to the first UE, an instruction to transmit a unicast communication including a set of missed packets to the second UE, as described above. In some aspects, the set of missed packets includes one or more decoded packets of the first set of decoded packets that are not included in the second set of decoded packets, as described above.

The process 900 may include additional aspects, such as any single aspect or any combination of aspects described below or in connection with one or more other processes described elsewhere herein.

In a first aspect, process 900 includes transmitting, to the plurality of UEs, an updated set of encoded packets based on the plurality of feedback messages.

In a second additional aspect, alone or in combination with the first aspect, process 900 includes generating the set of encoded packets using an encoding function; and generating the updated set of encoded packets using the encoding function.

In a third additional aspect, alone or in combination with one or more of the first and second aspects, the encoding function includes a random matrix, and process 900 includes indicating the random matrix to the plurality of UEs.

In a fourth additional aspect, alone or in combination with one or more of the first through third aspects, process 900 includes determining, based on the plurality of feedback messages, a group of decoded packets; and generating the updated set of encoded packets based on a difference between a patent pool used to generate the set of encoded packets and the group of decoded packets.

In a fifth additional aspect, alone or in combination with one or more of the first through fourth aspects, process 900 includes receiving, from the second UE, a third feedback message that indicates a third set of decoded packets including: a subset of the updated is setting of encoded packets; and a subset of the set of missed packets.

In a sixth additional aspect, alone or in combination with one or more of the first through fifth aspects, transmitting the instruction to the first UE includes transmitting a unicast transmission to the first UE.

In a seventh additional aspect, alone or in combination with one or more of the first through sixth aspects, transmitting the set of encoded packets includes transmitting the set of encoded packets using an access link between the BS and each of the plurality of UEs.

In an eighth additional aspect, alone or in combination with one or more of the first through seventh aspects, process 900 includes transmitting, to the first UE, a sidelink configuration.

In a ninth additional aspect, alone or in combination with one or more of the first through eighth aspects, the sidelink configuration indicates at least one of: a sidelink transmission resource, a frequency configuration, or an MCS pool.

In a tenth additional aspect, alone or in combination with one or more of the first through ninth aspects, the instruction is based on the sidelink configuration.

In an eleventh additional aspect, alone or in combination with one or more of the first through tenth aspects, process 900 includes receiving, from the first UE, an indication of a sidelink topology that indicates a sidelink connection between the first UE and the second UE.

In a twelfth additional aspect, alone or in combination with one or more of the first through eleventh aspects, process 900 includes receiving, from the first UE, an indication of an update to the sidelink topology.

In a thirteenth additional aspect, alone or in combination with one or more of the first through twelfth aspects, process 900 includes transmitting, to the first UE, a network coding configuration including a set of network coding parameters.

In a fourteenth additional aspect, alone or in combination with one or more of the first through thirteenth aspects, the set of network coding parameters indicate at least one of a network coding algorithm, an encoding function, an encoding matrix, a maximum number of decoding iterations, or a combination thereof.

In a fifteenth additional aspect, alone or in combination with one or more of the first through fourteenth aspects, the network coding configuration is carried in at least one of a MAC-CE, DCI, an RRC message, or a combination thereof.

In a sixteenth additional aspect, alone or in combination with one or more of the first through fifteenth aspects, process 900 includes determining that a performance of the first UE associated with the set of network coding parameters satisfies an underperformance threshold.

In a seventeenth additional aspect, alone or in combination with one or more of the first through sixteenth aspects, determining that the performance of the first UE satisfies the underperformance threshold includes receiving a network coding parameter change request from the first UE.

In an eighteenth additional aspect, alone or in combination with one or more of the first through seventeenth aspects, the network coding parameter change request is carried in at least one of a MAC-CE, UCI, or a combination thereof.

In a nineteenth additional aspect, alone or in combination with one or more of the first through eighteenth aspects, process 900 includes transmitting an additional set of network coding parameters to the first UE based on determining that the performance of the first UE satisfies the underperformance threshold.

In a twentieth additional aspect, alone or in combination with one or more of the first through nineteenth aspects, the additional set of network coding parameters is carried in at least one of a MAC-CE, DCI, or a combination thereof.

In a twenty-first additional aspect, alone or in combination with one or more of the first through twentieth aspects, process 900 includes transmitting an additional set of network coding parameters to the first UE; and transmitting a network coding parameter switch indication to the first UE based on determining that the performance of the first UE satisfies the underperformance threshold, where the network is coding parameter switch indication is to cause the first UE to instantiate the additional set of network coding parameters.

In a twenty-second additional aspect, alone or in combination with one or more of the first through twenty-first aspects, the network coding parameter switch indication is carried in at least one of a MAC-CE, DCI, or a combination thereof.

In a twenty-third additional aspect, alone or in combination with one or more of the first through twenty-second aspects, the plurality of feedback messages include at least one of a PDCP status report, an RLC status report, a MAC HARQ feedback message, a dedicated decoding feedback message, or a combination thereof.

In a twenty-fourth additional aspect, alone or in combination with one or more of the first through twenty-third aspects, the dedicated decoding feedback message includes a network coding sub-layer report.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on." As used herein, "satisfying a threshold" may refer to a value being greater than the threshold, greater than or equal to the threshold, less than the threshold, less than or equal to the threshold, equal to the threshold, or not equal to the threshold, among other examples. As used herein, a phrase referring to "at least one of" a list of items refers to any combination of those items, including single members. As an example, "at least one of: a, b, or c" is intended to cover: a, b, c, a-b, a-c, b-c, and a-b-c.

Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (for example, related items, unrelated items, or a combination of related and unrelated items), and may be used interchangeably with "one or more." Where only one item is intended, the phrase "only one" or similar language is used. Also, as used herein, the terms "has," "have," "having," and similar terms are intended to be open-ended terms. Further, as used herein, the term "or" is intended to be inclusive when used in a series and may be used interchangeably with "and/or," unless explicitly stated otherwise (for example, if used in combination with "either" or "only one of").

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs (such as one or more modules of computer program instructions) encoded on a computer storage media for execution by, or to control the operation of, a data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method of wireless communication performed by an apparatus of a first user equipment (UE), comprising:
   receiving, from a base station (BS), a set of encoded packets;
   transmitting, to the BS, a feedback message that indicates a set of decoded packets; and
   receiving, from the BS, an instruction to transmit a unicast sidelink communication comprising a set of missed packets to a second UE,
   wherein the second UE receives the set of encoded packets from the first UE, the set of missed packets including a subset of encoded packets of the set of encoded packets decoded by the first UE but not the second UE, and,
   wherein the set of missed packets includes one or more decoded packets of the set of decoded packets.

2. The method of claim 1, further comprising transmitting the unicast sidelink communication to the second UE.

3. The method of claim 1, further comprising receiving, from the BS, an updated set of encoded packets based on the feedback message.

4. The method of claim 3, further comprising:
   decoding the set of encoded packets using a decoding function corresponding to an encoding function used to generate the set of encoded packets; and
   decoding the updated set of encoded packets using the decoding function.

5. The method of claim 1, further comprising receiving, from the BS, a sidelink configuration, wherein the sidelink configuration indicates at least one of:
   a sidelink transmission resource,
   a frequency configuration, or
   a modulation and coding scheme (MCS) pool; and
   wherein the instruction is based on the sidelink configuration.

6. The method of claim 1, further comprising receiving, from the BS, a network coding configuration comprising a set of network coding parameters.

7. The method of claim 6, wherein the set of network coding parameters indicate at least one of:
   a network coding algorithm,
   an encoding function,
   an encoding matrix,
   a maximum number of decoding iterations, or
   a combination thereof.

8. The method of claim 6, further comprising:
   determining that a performance of the first UE associated with the set of network coding parameters satisfies an underperformance threshold; and
   transmitting, to the BS, a network coding parameter change request based on determining that the performance of the first UE satisfies the underperformance threshold.

9. The method of claim 8, wherein the network coding parameter change request is carried in at least one of:
   a medium access control (MAC) control element (MAC-CE),
   uplink control information (UCI), or
   a combination thereof.

10. The method of claim 8, further comprising:
    receiving an additional set of network coding parameters from the BS based on the network coding parameter change request.

11. The method of claim 10, wherein the additional set of network coding parameters is carried in at least one of:
    a medium access control (MAC) control element (MAC-CE),
    downlink control information (DCI), or
    a combination thereof.

12. The method of claim 8, further comprising:
    receiving an additional set of network coding parameters from the BS;
       receiving a network coding parameter switch indication from the BS based on the network coding parameter change request; and
       instantiating, based on the network coding parameter switch indication, the additional set of network coding parameters.

13. The method of claim 12, wherein the network coding parameter switch indication is carried in at least one of:
    a medium access control (MAC) control element (MAC-CE),
    downlink control information (DCI), or
    a combination thereof.

14. The method of claim 1, wherein the plurality of feedback messages comprise at least one of: a packet data convergence protocol (PDCP) status report, a radio link control (RLC) status report, a medium access control (MAC) hybrid automatic repeat request (HARQ) feedback message, a dedicated decoding feedback message, or a combination therefore; and wherein the dedicated decoding feedback message comprises a network coding sub-layer report.

15. A method of wireless communication performed by an apparatus of a base station (BS), comprising:
    transmitting, to a plurality of user equipment (UEs), a set of encoded packets;
    receiving a plurality of feedback messages from the plurality of UEs, the plurality of feedback messages comprising:
    a first feedback message, received from a first UE, that indicates a first set of decoded packets including a first subset of the set of encoded packets,
    a second feedback message, received from a second UE, that indicates a second set of decoded packets including a second subset of the set of encoded packets; and
    transmitting, to the first UE, an instruction to transmit a unicast communication comprising a set of missed packets to the second UE,
    wherein the set of missed packets includes one or more decoded packets of the first set of decoded packets that are not included in the second set of decoded packets.

16. The method of claim 15, further comprising transmitting, to the plurality of UEs, an updated set of encoded packets based on the plurality of feedback messages.

17. The method of claim 16, further comprising:
    determining, based on the plurality of feedback messages, a group of decoded packets; and
    generating the updated set of encoded packets based on a difference between a packet pool used to generate the set of encoded packets and the group of decoded packets.

18. The method of claim 15, further comprising transmitting, to the first UE, a sidelink configuration, wherein the sidelink configuration indicates at least one of:
    a sidelink transmission resource,
    a frequency configuration, or
    a modulation and coding scheme pool; and
    wherein the instruction is based on the sidelink configuration.

19. The method of claim 15, further comprising transmitting, to the first UE, a network coding configuration comprising a set of network coding parameters.

20. The method of claim 19, further comprising:
    determining that a performance of the first UE associated with the set of network coding parameters satisfies an underperformance threshold.

21. The method of claim 20, wherein determining that the performance of the first UE satisfies the underperformance threshold comprises receiving a network coding parameter change request from the first UE.

22. The method of claim 21, further comprising:
    transmitting an additional set of network coding parameters to the first UE based on determining that the performance of the first UE satisfies the underperformance threshold.

23. The method of claim 21, further comprising:
    transmitting an additional set of network coding parameters to the first UE; and
    transmitting a network coding parameter switch indication to the first UE based on determining that the performance of the first UE satisfies the underperformance threshold, wherein the network coding parameter switch indication is to cause the first UE to instantiate the additional set of network coding parameters.

24. The method of claim 15, wherein the plurality of feedback messages comprise at least one of:
a packet data convergence protocol (PDCP) status report,
a radio link control (RLC) status report,
a medium access control (MAC) hybrid automatic repeat request (HARD) feedback message,
a dedicated decoding feedback message, or
a combination thereof; and
wherein the dedicated decoding feedback message comprises a network coding sub-layer report.

25. An apparatus of a first user equipment (UE) for wireless communication, comprising:
a first interface configured to obtain: a set of encoded packets; and an instruction to output a unicast sidelink communication comprising a set of missed packets to a second UE,
wherein the second UE receives the set of encoded packets from the base station as the first UE, the set of missed packets including a subset of encoded packets of the set of encoded packets decoded by the first UE but not the second UE, and
wherein the set of missed packets includes one or more decoded packets of a set of decoded packets; and
the first interface or a second interface configured to output a feedback message that indicates the set of decoded packets.

26. The apparatus of claim 25, wherein the feedback message comprises at least one of:
a packet data convergence protocol (PDCP) status report,
a radio link control (RLC) status report,
a medium access control (MAC) hybrid automatic repeat request (HARD) feedback message,
a dedicated decoding feedback message, or
a combination thereof.

27. The apparatus of claim 26, wherein the dedicated decoding feedback message comprises a network coding sub-layer report.

28. An apparatus of a base station (BS) for wireless communication, comprising:
a first interface configured to obtain:
a plurality of feedback messages, the plurality of feedback messages comprising:
a first feedback message that indicates a first set of decoded packets including a first subset of a set of encoded packets, and
a second feedback message that indicates a second set of decoded packets including a second subset of the set of encoded packets, and
the first interface or a second interface configured to output:
the set of encoded packets; and
an instruction to output a unicast communication comprising a set of missed packets,
wherein the set of missed packets includes one or more decoded packets of the first set of decoded packets that are not included in the second set of decoded packets.

29. The apparatus of claim 28, wherein the first interface or the second interface is further configured to output an updated set of encoded packets based on the plurality of feedback messages.

30. The apparatus of claim 29, further comprising a processing system configured to:
determine, based on the plurality of feedback messages, a group of decoded packets; and
generate the updated set of encoded packets based on a difference between a packet pool used to generate the set of encoded packets and the group of decoded packets.

* * * * *